(12) United States Patent
Lee

(10) Patent No.: US 10,447,061 B2
(45) Date of Patent: Oct. 15, 2019

(54) METHOD FOR PERFORMING WIRELESS CHARGING CONTROL OF AN ELECTRONIC DEVICE WITH AID OF VARIANT SLOT TIMING AND SIMPLE RESPONSE INDICATING ACKNOWLEDGEMENT, AND ASSOCIATED APPARATUS

(71) Applicant: MEDIATEK INC., Hsin-Chu (TW)

(72) Inventor: Chi-Min Lee, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 3 days.

(21) Appl. No.: 15/098,328

(22) Filed: Apr. 14, 2016

(65) Prior Publication Data

US 2016/0233715 A1 Aug. 11, 2016

Related U.S. Application Data

(63) Continuation-in-part of application No. 14/307,501, filed on Jun. 18, 2014.
(Continued)

(51) Int. Cl.
*H02J 7/02* (2016.01)
*H04L 1/16* (2006.01)
(Continued)

(52) U.S. Cl.
CPC ............. *H02J 7/025* (2013.01); *H02J 17/00* (2013.01); *H04L 1/1657* (2013.01);
(Continued)

(58) Field of Classification Search
CPC ............. H02J 7/025; H02J 7/027; H02J 7/041
(Continued)

(56) References Cited

U.S. PATENT DOCUMENTS

| 5,245,611 A | 9/1993 | Ling et al. |
| 8,928,276 B2 | 1/2015 | Kesler et al. |

(Continued)

FOREIGN PATENT DOCUMENTS

| CN | 101154312 A | 4/2008 |
| CN | 101449521 A | 6/2009 |

(Continued)

OTHER PUBLICATIONS

Chi-Min Lee et al., Title: Method for Performing Wireless Charging Control of an Electronic Device With Aid of Simple Response Indicating Acknowledgement, and Associated Apparatus, pending U.S. Appl. No. 15/098,338, filed Apr. 14, 2016.

(Continued)

*Primary Examiner* — M Baye Diao
(74) *Attorney, Agent, or Firm* — Wolf, Greenfield & Sacks, P.C.

(57) ABSTRACT

A method for performing wireless charging control of an electronic device and an associated apparatus are provided, where the method may include: determining whether a voltage level of a direct current (DC) output at a DC output terminal of a rectifier in the electronic device is greater than a first voltage threshold to generate a first detection result; and according to the first detection result, selectively sending at least one random phase-delay packet, wherein each random phase-delay packet of the at least one random phase-delay packet has a random phase-delay with respect to a time slot, and the at least one random phase-delay packet is utilized for carrying information of at least one wireless charging report of the electronic device. More particularly, a wireless charging device is arranged to wirelessly charge the electronic device, and the electronic device does not obtain information from the wireless charging device through any packet.

13 Claims, 16 Drawing Sheets

Related U.S. Application Data

(60) Provisional application No. 62/152,200, filed on Apr. 24, 2015, provisional application No. 61/928,093, filed on Jan. 16, 2014.

(51) Int. Cl.
*H02J 17/00* (2006.01)
*H02J 7/04* (2006.01)

(52) U.S. Cl.
CPC ............ *H04L 1/1692* (2013.01); *H02J 7/027* (2013.01); *H02J 7/041* (2013.01)

(58) Field of Classification Search
USPC ......... 320/108; 307/104; 455/41.1, 572, 573
See application file for complete search history.

(56) References Cited

U.S. PATENT DOCUMENTS

| | | | |
|---|---|---|---|
| 9,520,739 B2* | 12/2016 | Endo | H02J 5/005 |
| 9,685,815 B2 | 6/2017 | Lee | |
| 9,906,063 B2 | 2/2018 | Lee | |
| 2003/0093187 A1 | 5/2003 | Walker | |
| 2009/0039828 A1 | 2/2009 | Jakubowski | |
| 2011/0196544 A1* | 8/2011 | Baarman | H02J 5/005 |
| | | | 700/291 |
| 2012/0306284 A1 | 12/2012 | Lee et al. | |
| 2012/0313445 A1 | 12/2012 | Park | |
| 2012/0313448 A1 | 12/2012 | Anttila | |
| 2012/0329405 A1 | 12/2012 | Lee | |
| 2013/0002038 A1* | 1/2013 | Lee | H02J 7/00 |
| | | | 307/104 |
| 2013/0094598 A1 | 4/2013 | Bastami | |
| 2013/0285465 A1 | 10/2013 | Takeda et al. | |
| 2014/0084822 A1 | 3/2014 | Ito et al. | |
| 2014/0167688 A1 | 6/2014 | Doyle et al. | |
| 2014/0176061 A1 | 6/2014 | Cheatham, III et al. | |
| 2014/0176082 A1 | 6/2014 | Visser | |
| 2014/0184147 A1 | 7/2014 | Uchida | |
| 2014/0191568 A1* | 7/2014 | Partovi | H02J 7/025 |
| | | | 307/9.1 |
| 2014/0191717 A1 | 7/2014 | Hong et al. | |
| 2014/0285145 A1 | 9/2014 | Patro et al. | |
| 2014/0298447 A1 | 10/2014 | Chu | |
| 2014/0339916 A1 | 11/2014 | Fells et al. | |
| 2015/0194838 A1* | 7/2015 | Won | H02J 7/025 |
| | | | 320/108 |
| 2015/0198640 A1 | 7/2015 | Lee | |
| 2015/0201351 A1 | 7/2015 | Lee | |
| 2016/0007168 A1 | 1/2016 | Bair | |
| 2016/0233715 A1 | 8/2016 | Lee | |
| 2016/0233716 A1 | 8/2016 | Lee et al. | |
| 2016/0233728 A1* | 8/2016 | Park | H04L 1/00 |
| 2018/0138733 A1 | 5/2018 | Lee | |
| 2018/0341760 A1* | 11/2018 | Frempong | G06F 21/32 |

FOREIGN PATENT DOCUMENTS

| | | |
|---|---|---|
| CN | 102130477 A | 7/2011 |
| CN | 102224740 A | 10/2011 |
| CN | 102694423 A | 9/2012 |
| CN | 103370885 A | 10/2013 |
| CN | 103427499 A | 12/2013 |
| CN | 103427862 A | 12/2013 |
| CN | 103457362 A | 12/2013 |
| CN | 104471833 A | 3/2015 |
| JP | 2010028935 A | 2/2010 |
| TW | 201401714 | 1/2014 |
| WO | 02073901 A1 | 9/2002 |
| WO | 2013002437 A1 | 1/2013 |

OTHER PUBLICATIONS

Office Communication dated Oct. 11, 2016 for U.S. Appl. No. 14/307,501.
Office Action dated Sep. 19, 2016 from Chinese Application No. 201510019350.7.
Office Action dated Sep. 30, 2016 for U.S. Appl. No. 15/559,884.
Office Action from Chinese Patent Application No. 201510023086.4 dated Aug. 3, 2016.
Office Action dated Oct. 22, 2015 from corresponding Taiwan Patent Application No. TW104214470.

* cited by examiner

METHOD FOR PERFORMING WIRELESS CHARGING CONTROL OF AN ELECTRONIC DEVICE WITH AID OF VARIANT SLOT TIMING AND SIMPLE RESPONSE INDICATING ACKNOWLEDGEMENT, AND ASSOCIATED APPARATUS

CROSS REFERENCE TO RELATED APPLICATION

This application claims the benefit of U.S. Provisional Application No. 62/152,200, which was filed on Apr. 24, 2015, and is included herein by reference. In addition, this application is a continuation-in-part application and claims the benefit of U.S. Non-provisional application Ser. No. 14/307,501, which was filed on Jun. 18, 2014, and is included herein by reference. Additionally, the U.S. Non-provisional application Ser. No. 14/307,501 claims the benefit of U.S. Provisional Application No. 61/928,093, which was filed on Jan. 16, 2014.

BACKGROUND

The present invention relates to wirelessly charging multiple devices with the same wireless charging device, and more particularly, to a method for performing wireless charging control of an electronic device, and an associated apparatus.

According to the related art, a conventional wireless power transfer system may comprise a conventional transmitter pad that is arranged to charge multiple conventional electronic devices wirelessly. In order to accurately control the charging power, it is suggested in the related art to implement in-band or out-band communications between the conventional transmitter pad and the conventional electronic devices within the conventional wireless power transfer system. For in-band communications, bidirectional in-band communication using ISM band was restricted by FCC part 15/18. Even FCC agreed bidirectional in-band communication for pure wireless power control in late 2013, unidirectional in-band communication will still be preferred either for some other future regulation, simplicity or cost while comparing with bidirectional in-band communication. Adopting out-band bi-directional communication will be free from government regulation issues. However, some problems such as some side effects may occur. For example, in a situation where the aforementioned out-band communications is implemented with Bluetooth (BT) technologies, wireless communications components corresponding to the frequency band for BT should be added into the conventional transmitter pad and the conventional electronic devices, respectively, causing the related costs (e.g. material costs and labor costs) to be increased. In another example, as the number of devices using the same frequency band for BT in the place where the user stays (e.g. the office of the user) may increase significantly, the user (or somebody nearby) may suffer from insufficiency of the channels within the frequency band. Thus, a novel method is required to enhance the wireless charging control of an electronic device.

SUMMARY

It is an objective of the claimed invention to provide a method for performing wireless charging control of an electronic device, and an associated apparatus, in order to solve the above-mentioned problems.

According to at least one preferred embodiment, a method for performing wireless charging control of an electronic device is provided, where the method may comprise the steps of: determining whether a voltage level of a direct current (DC) output at a DC output terminal of a rectifier in the electronic device falls within a first voltage range to generate a first detection result; and according to the first detection result, selectively sending at least one packet (e.g. one or more packets), wherein the aforementioned at least one packet is utilized for carrying information of at least one wireless charging report of the electronic device. Examples of the aforementioned at least one packet may include, but not limited to, at least one random phase-delay packet (e.g. one or more random phase-delay packets), wherein each random phase-delay packet of the aforementioned at least one random phase-delay packet has a random phase-delay with respect to a time slot, and the aforementioned at least one random phase-delay packet is utilized for carrying information of at least one wireless charging report (e.g. one or more wireless charging reports) of the electronic device. For example, the method may comprise determining whether the voltage level of the DC output at the DC output terminal of the rectifier in the electronic device is greater than a first voltage threshold to generate the first detection result, where the first voltage threshold may be associated to the first voltage range, and more particularly, may be an upper bound or a lower bound of the first voltage range. According to some embodiments, an apparatus for performing wireless charging control according to the above method is provided, where the apparatus may comprise at least one portion (e.g. a portion or all) of the electronic device.

According to at least one preferred embodiment, an apparatus for performing wireless charging control according to the above method is provided, where the apparatus may comprise at least one portion (e.g. a portion or all) of the electronic device. The apparatus comprises a controller, and further comprises a communications module, which is coupled to the controller and a coil of the electronic device. The controller is arranged for determining whether a voltage level of a DC output at a DC output terminal of a rectifier in the electronic device falls within a first voltage range to generate a first detection result. In addition, the communications module is arranged for, according to the first detection result, selectively sending at least one packet (e.g. one or more packets), wherein the aforementioned at least one packet is utilized for carrying information of at least one wireless charging report of the electronic device. Examples of the aforementioned at least one packet may include, but not limited to, at least one random phase-delay packet (e.g. one or more random phase-delay packets), wherein each random phase-delay packet of the aforementioned at least one random phase-delay packet has a random phase-delay with respect to a time slot, and the aforementioned at least one random phase-delay packet is utilized for carrying information of at least one wireless charging report (e.g. one or more wireless charging reports) of the electronic device. For example, the controller may determine whether the voltage level of the DC output at the DC output terminal of the rectifier in the electronic device is greater than a first voltage threshold to generate the first detection result, where the first voltage threshold may be associated to the first voltage range, and more particularly, may be an upper bound or a lower bound of the first voltage range.

According to at least one preferred embodiment, a method for performing wireless charging control of an electronic device with aid of simple response of a wireless charging device is provided, where the wireless charging device is arranged to wirelessly charge the electronic device, and the method may comprise the steps of: receiving a packet from the electronic device, wherein the packet is utilized for carrying information of wireless charging reports of the electronic device, and comprises unacknowledged header information; and controlling the wireless charging device to generate at least one simple response, to acknowledge the packet. For example, the method may comprise receiving a plurality of packets from the electronic device, and the plurality of packets may comprise the packet, wherein each packet of the plurality of packets is utilized for carrying information of wireless charging reports of the electronic device, and comprises unacknowledged header information. Examples of the aforementioned at least one simple response may include, but not limited to, at least one simple response corresponding to at least one packet of the plurality of packets, for acknowledging the aforementioned at least one packet of the plurality of packets. According to some embodiments, an apparatus for performing wireless charging control according to the above method is provided, where the apparatus may comprise at least one portion (e.g. a portion or all) of the electronic device.

According to at least one preferred embodiment, a method for performing wireless charging control of an electronic device with aid of variant slot timing is provided, where the method may comprise: performing uni-directional packet transmission between the electronic device and a wireless charging device, wherein the wireless charging device is arranged to wirelessly charge the electronic device, and at least one packet of the uni-directional packet transmission is utilized for carrying information of at least one wireless charging report of the electronic device; and controlling a time slot of the uni-directional packet transmission to be variant. For example, controlling the time slot of the uni-directional packet transmission to be variant may comprise changing a length of the time slot of the uni-directional packet transmission in response to a plurality of predetermined condition.

It is an advantage of the present invention that the present invention method and the associated apparatus can prevent, or greatly decrease the probability of, data collision of wireless charging report packets from multiple devices that are wirelessly charged at the same time. In addition, the present invention method and the associated apparatus can keep power control loops (e.g. the power control loops of the wireless power transfer system, which may comprise the wireless charging device and the electronic device) working by a simple one way communications control scheme, free from any dual way communications regulation, where power consumption can be reduced when the wireless charging device such as a transmitter pad is not transmitting any modulation signal. Additionally, the present invention method and the associated apparatus can prevent the related art problems (e.g. the problem of increased costs, and the problem of insufficiency of the channels within the frequency band).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
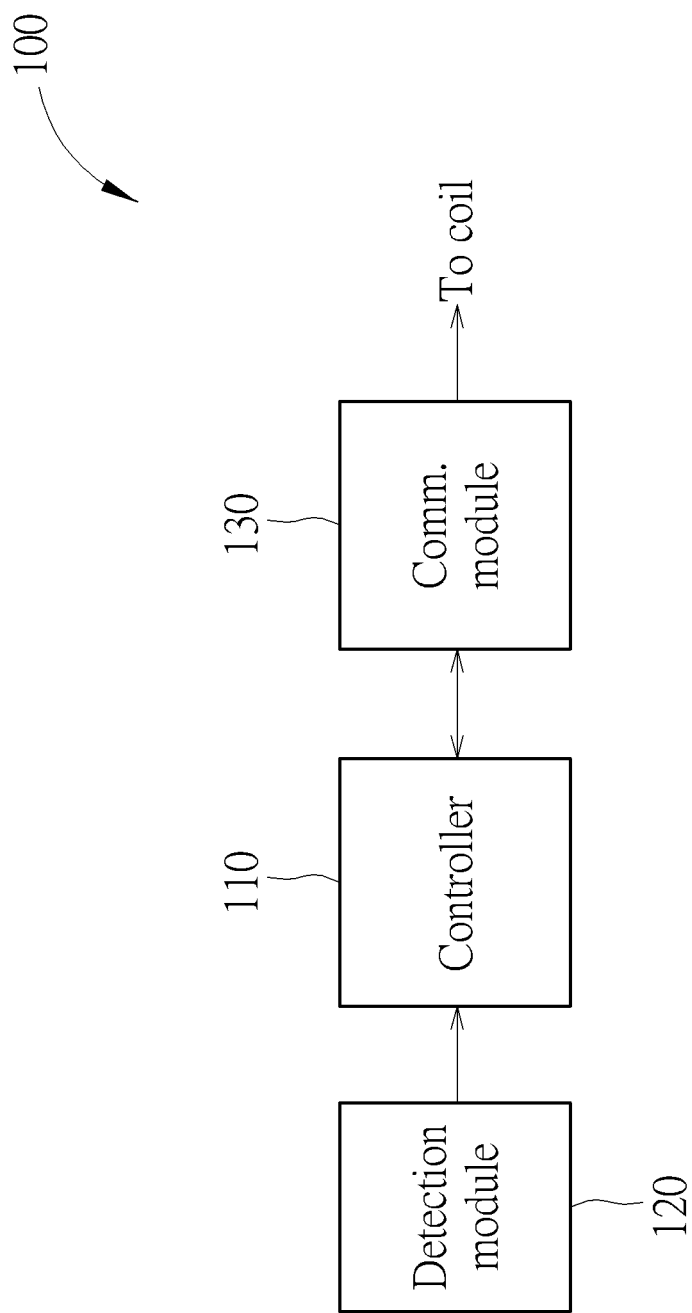
FIG. 1 is a diagram of an apparatus for performing wireless charging control of an electronic device according to a first embodiment of the present invention.

Please refer to FIG. 1, which illustrates a diagram of an apparatus 100 for performing wireless charging control of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless power transfer system comprising the electronic device). Examples of the electronic device may include, but not limited to, a mobile phone (e.g. a multifunctional mobile phone), a personal digital assistant (PDA), and a personal computer such as a laptop computer.

As shown in FIG. 1, the apparatus 100 may comprise a controller 110 (e.g. a microprocessor), a detection module 120, and a communications module 130 (labeled "Comm. module" in FIG. 1, for brevity), where the controller 110 is coupled to the detection module 120 and the communications module 130, and the communications module 130 can be coupled to a coil such as a power input coil (not shown in FIG. 1) of the electronic device. According to this embodiment, the controller 110 is arranged to perform wireless charging control. In addition, the detection module 120 is arranged to perform some detection operations (e.g. current detection operations and/or voltage detection operations) for the controller 110. Additionally, the communications module 130 is arranged to perform packet transmission for the controller 110 by utilizing the coil mentioned above, such as the aforementioned power input coil of the electronic device.

More particularly, the controller 110 may perform input power estimation in a situation where the electronic device is charged wirelessly, to generate information regarding the power that is received through wireless charging, for performing wireless charging control operations. Examples of the wireless charging control operations may include, but not limited to, increasing the charging power, decreasing the charging power, and performing foreign object detection (FOD). Regarding implementation details of the wireless charging technologies such as the aforementioned FOD, please refer to the Wireless Power Consortium (WPC) Qi V1.1 standard for more information.

Figure 2:
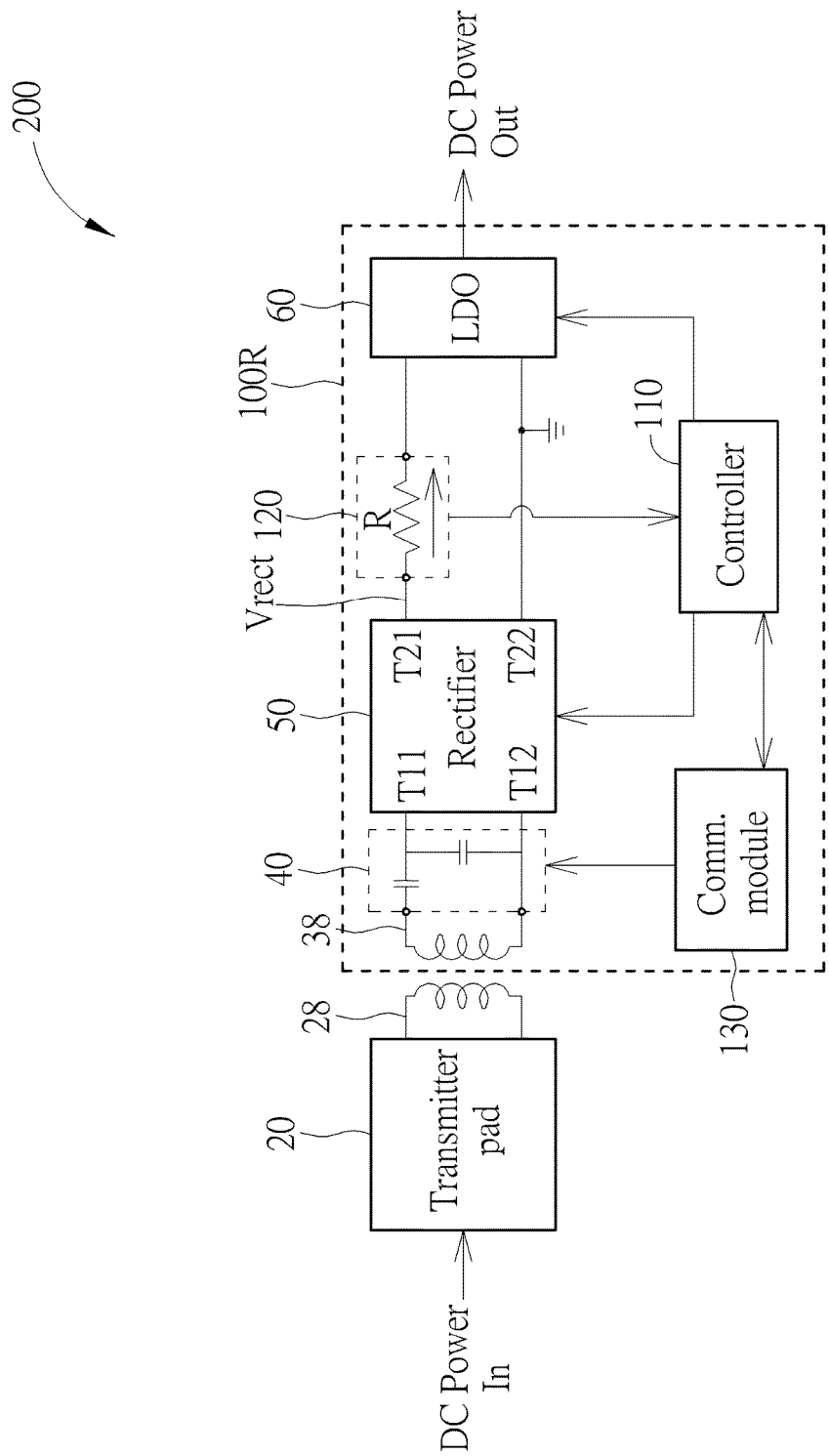
FIG. 2 is a diagram of a wireless power transfer system according to an embodiment of the present invention.

FIG. 2 is a diagram of a wireless power transfer system 200 according to an embodiment of the present invention, where the apparatus 100 may comprise at least one portion (e.g. a portion or all) of the wireless power transfer system 200. For example, the apparatus 100 may comprise a portion of the wireless power transfer system 200, and more particularly, can be a wireless charging receiver 100R (which can also be referred to as the receiver, for brevity) within the electronic device mentioned above, which means the apparatus 100 may comprise all components within the wireless charging receiver 100R shown in FIG. 2. In another example, the apparatus 100 may comprise a portion of the wireless power transfer system 200, and more particularly, can be the whole of the electronic device mentioned above, which means the apparatus 100 may comprise all components within the electronic device. In another example, the apparatus 100 can be the whole of the wireless power transfer system 200.

As shown in FIG. 2, in addition to the wireless charging receiver 100R, the wireless power transfer system 200 may further comprise a wireless charging device such as a transmitter pad 20 equipped with a power output coil 28. For better comprehension, the power output coil 28 can be illustrated outside the transmitter pad 20. This is for illustrative purposes only, and is not meant to be a limitation of the present invention. According to some variations of this embodiment, the power output coil 28 can be integrated into the transmitter pad 20. According to this embodiment, in addition to the controller 110, the detection module 120, and the communications module 130 mentioned above, the wireless charging receiver 100R may further comprise a power input coil 38, a matching circuit 40, a rectifier 50, and a low dropout (LDO) regulator 60 (labeled "LDO" in FIG. 2, for brevity), where the detection module 120 can be coupled to a specific stage of the wireless charging receiver 100R, and more particularly, can be coupled to the direct current (DC) output terminal T21 of the rectifier 50 of the electronic device, and the two alternating current (AC) input terminals T11 and T12 of the rectifier 50 are coupled to the two terminals of the power input coil 38 of the electronic device. In this embodiment, the terminal T22 of the rectifier 50 can be regarded as a ground terminal, and the two terminals T21 and T22 can be utilized for coupling the next stage such as the LDO regulator 60. More particularly, the rectifier 50 may obtain an AC input from the power input coil 38 through the two AC input terminals T11 and T12 of the rectifier 50, and rectifies the AC input to provide a DC output at the DC output terminal T21, such as a DC voltage level Vrect with respect to a ground voltage level at the terminal T22 (i.e. the ground terminal). For example, the AC input can be obtained from the power input coil 38 when the electronic device is wirelessly charged through the power input coil 38 by the transmitter pad 20.

In practice, the matching circuit 40 may comprise some impedance components such as some capacitors. In addition, the detection module 120 of this embodiment may comprise a current sensing resistor R, where one of the two terminals of the current sensing resistor R (e.g. the left terminal thereof in this embodiment) is coupled to the DC output terminal T21 of the rectifier 50, and another of the two terminals of the current sensing resistor R (e.g. the right terminal thereof in this embodiment) is coupled to a DC input terminal of the next stage of the rectifier 50, such as the upper left terminal of the LDO regulator 60 in this embodiment. For example, the detection module 120 may further comprise an analog-to-digital converter (ADC), which is integrated into the detection module 120 and is coupled to the current sensing resistor R of the detection module 120 in this embodiment. More particularly, the detection module 120 may detect at least one voltage difference (e.g. one or more voltage differences) between the two terminals of the current sensing resistor R, and may utilize the aforementioned ADC (not shown in FIG. 2) within the detection module 120 to perform analog-to-digital conversion on the aforementioned at least one voltage difference, in order to generate a digital output signal of the detection module 120, where the digital output signal of this embodiment may carry at least one digital value (e.g. one or more digital values) corresponding to the aforementioned at least one voltage difference, and is output to the controller 110. As the magnitude of the current passing through the current sensing resistor R can be derived from dividing the aforementioned at least one digital value (which can be regarded as the digital form of the aforementioned at least one voltage difference) by the resistance value of the current sensing resistor R, the digital output signal of the detection module 120 (more particularly, the aforementioned at least one digital value carried by the digital output signal) may indicate the current that is output through the DC output terminal T21 of the rectifier 50. As a result of some associated calculations, the controller 110 may perform power estimation of at least one portion (e.g. a portion or all) of the wireless charging receiver 100R, such as at least one stage (e.g. one or more stages) of the wireless charging receiver 100R.

Based on the architecture shown in FIG. 2, electric power may be transferred from the left side (e.g. the input labeled "DC Power In" in the leftmost of FIG. 2) to the right side (e.g. the input labeled "DC Power Out" in the rightmost of FIG. 2) stage by stage, where power loss may occur in some of the stages in this architecture. The controller 110 can estimate the received power of at least one portion (e.g. a portion or all) of the wireless charging receiver 100R, such as that of at least one stage (e.g. one or more stages) of the wireless charging receiver 100R, and can further send at least one wireless charging report (e.g. one or more wireless charging reports) such as at least one received power report corresponding to at least one estimated value (e.g. one or more estimated values) of the received power mentioned above to the transmitter pad 20 through related components (e.g. the communications module 130, the matching circuit 40, the power input coil 38, and the power output coil 28). As a result, wireless charging control can be performed properly in various situations.

According to this embodiment, the LDO regulator 60 can be utilized as the next stage of the rectifier 50. This is for illustrative purposes only, and is not meant to be a limitation of the present invention. According to some variations of this embodiment, the LDO regulator 60 can be omitted, and some circuits of the electronic device mentioned above may directly utilize the aforementioned DC output such as the DC voltage level Vrect mentioned above.

For better comprehension, the architecture shown in FIG. 2 can be illustrated with a scenario having the aforementioned electronic device wirelessly charged by the transmitter pad 20. This is for illustrative purposes only, and is not meant to be a limitation of the present invention. According to some variations of this embodiment, the architecture shown in FIG. 2 can be extended to illustrate some other scenarios having multiple copies (e.g. two copies, or more than two copies) of the aforementioned electronic device that are wirelessly charged by the transmitter pad 20 at the same time. Thus, in these variations, the wireless power transfer system 200 may comprise a plurality of copies of the wireless charging receiver 100R, such as the wireless charging receivers {100R} of the aforementioned multiple copies of the electronic device that are wirelessly charged by the transmitter pad 20 at the same time. For brevity, similar descriptions for these variations are not repeated in detail here.

Figure 3:
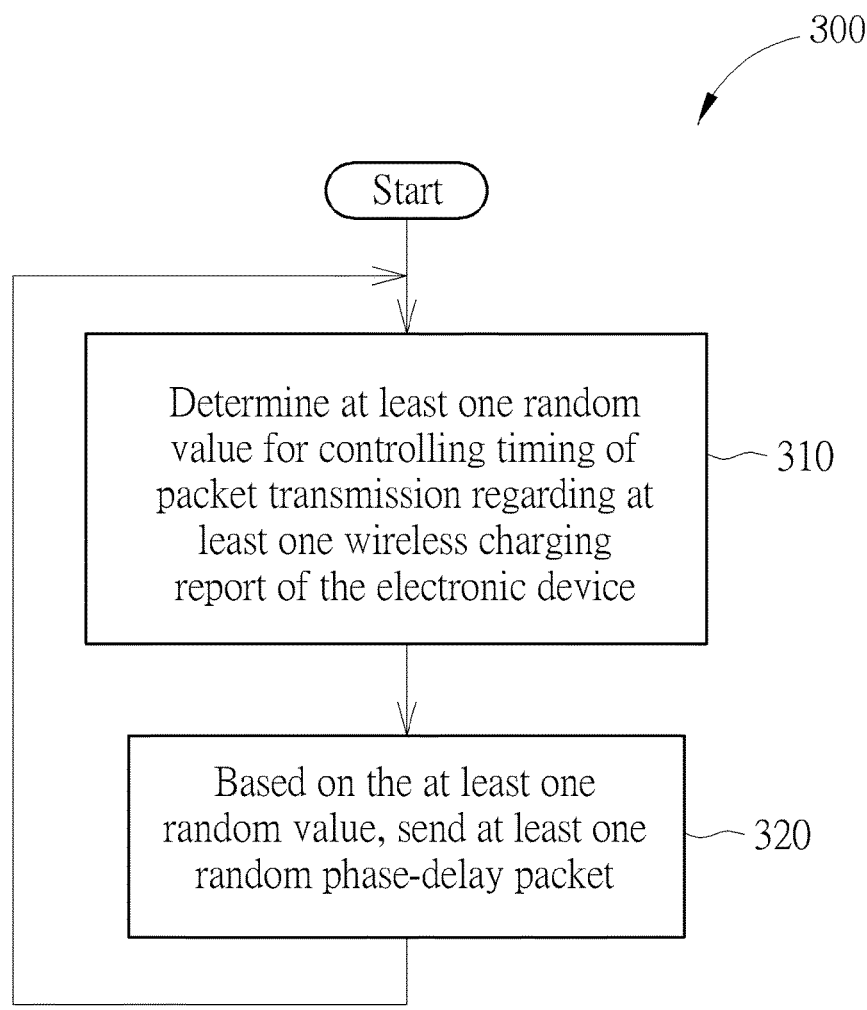
FIG. 3 illustrates a flowchart of a method for performing wireless charging control of an electronic device according to an embodiment of the present invention.

FIG. 3 illustrates a flowchart of a method 300 for performing wireless charging control of an electronic device according to an embodiment of the present invention. The method 300 shown in FIG. 3 can be applied to the apparatus 100 shown in FIG. 1 (more particularly, the wireless power transfer system 200 of the embodiment shown in FIG. 2), and can be applied to the controller 110 thereof. The method can be described as follows.

In Step 310, the controller 110 determines at least one random value (e.g. one or more random values) for controlling timing of packet transmission regarding at least one wireless charging report (e.g. one or more wireless charging reports) of the electronic device, such as the aforementioned at least one wireless charging report in the embodiment shown in FIG. 2. For example, in a situation where the aforementioned at least one random value represents a plurality of random values and the aforementioned at least one wireless charging report represents a plurality of wireless charging reports to be sent to the wireless charging device mentioned in the embodiment shown in FIG. 2 (e.g. the transmitter pad 20 in the wireless power transfer system 200) in a series of time slots, respectively, the plurality of random values may cause the timing of packet transmission in each of the series of time slots to be random.

In Step 320, based on the aforementioned at least one random value (more particularly, the aforementioned at least one random value that is just determined in Step 310), the controller 110 utilizes the communications module 130 to send at least one random phase-delay packet (e.g. one or more random phase-delay packets), where each random phase-delay packet of the aforementioned at least one random phase-delay packet has a random phase-delay with respect to a time slot (e.g. a corresponding time slot), and the aforementioned at least one random phase-delay packet is utilized for carrying information of the aforementioned at least one wireless charging report (more particularly, the aforementioned at least one wireless charging report in Step 310). For example, the phase-delay of the aforementioned each random phase-delay packet can be defined as the delay amount of the beginning of this random phase-delay packet, measured from the beginning of the corresponding time slot. This is for illustrative purposes only, and is not meant to be a limitation of the present invention. In another example, the phase-delay of the aforementioned each random phase-delay packet can be defined as the ratio of the delay amount of the beginning of this random phase-delay packet, measured from the beginning of the corresponding time slot, to the length of this time slot. In some other examples, the reference point for measuring the delay amount mentioned above in the corresponding time slot may vary.

No matter which of the above definitions of the phase-delay of the aforementioned each random phase-delay packet is applied, in a situation where the aforementioned at least one random value represents the plurality of random values mentioned above and the aforementioned at least one wireless charging report represents the plurality of wireless charging reports mentioned above, the aforementioned at least one random phase-delay packet may represent a plurality of random phase-delay packets transmitted in the series of time slots, respectively. In addition, based on the plurality of random values, the controller 110 utilizes the communications module 130 to send the plurality of random phase-delay packets, and controls the phase-delays of the plurality of random phase-delay packets in the series of time slots to be random, respectively. As a result, in the scenarios having the aforementioned multiple copies (e.g. two copies, or more than two copies) of the electronic device that are wirelessly charged by the transmitter pad 20 at the same time, the present invention method and the associated apparatus (e.g. the method 300 and the apparatus 100) can prevent, or greatly decrease the probability of, data collision of wireless charging report packets from multiple devices that are wirelessly charged at the same time, since data collision is typically known as the result of simultaneous data packet transmission between two or more devices.

Please note that the operation of Step 310 and the operation of Step 320 are illustrated in FIG. 3, respectively. This is for illustrative purposes only, and is not meant to be a limitation of the present invention. According to some variations of this embodiment, at least one portion (e.g. a portion or all) of the operation of Step 310 and at least one portion (e.g. a portion or all) of the operation of Step 320 can be performed at the same time.

According to this embodiment, based on the aforementioned at least one random value, the controller 110 utilizes the communications module 130 to send the aforementioned at least one random phase-delay packet (e.g. one or more random phase-delay packets) to the wireless charging device such as the transmitter pad 20, without obtaining information from the wireless charging device through any packet. For example, the wireless charging device does not send any packet to the electronic device, and the wireless charging device may simply receive the aforementioned at least one random phase-delay packet. Therefore, the present invention method and the associated apparatus (e.g. the method 300 and the apparatus 100) can keep power control loops of the wireless power transfer system 200 working by a simple one way communications control scheme, free from any dual way communications regulation, where power consumption can be reduced when the wireless charging device such as the transmitter pad 20 is not transmitting any modulation signal (e.g. the wireless charging). In comparison with the related art, the present invention method and the associated apparatus can guarantee the overall performance, and the related art problems (e.g. the problem of increased costs, and the problem of insufficiency of the channels within the frequency band) can be prevented.

In some embodiments of the present invention, based on the aforementioned at least one random value, the controller 110 utilizes the communications module 130 to send the aforementioned at least one random phase-delay packet (e.g. one or more random phase-delay packets) to the wireless charging device such as the transmitter pad 20, to trigger an associated wireless charging control operation of the wireless charging device, such as any of the wireless charging control operations mentioned above. More particularly, the wireless charging device may receive a specific random phase-delay packet within the aforementioned at least one random phase-delay packet (e.g. one of the plurality of random phase-delay packets) by detecting the specific random phase-delay packet in a packet detection window. For example, the length of the packet detection window can be equivalent to a predetermined value. This is for illustrative purposes only, and is not meant to be a limitation of the present invention. In another example, the ratio of the length of the packet detection window to the length of the time slot mentioned in Step 320 (e.g. the corresponding time slot) can be greater than or equal to one.

In another example, the wireless charging device such as the transmitter pad 20 is arranged to wirelessly charge the electronic device and another electronic device (e.g. a copy of the electronic device) at the same time. When it is detected that data collision exists in this packet detection window, the wireless charging device may immediately abort using this packet detection window and receive the next random phase-delay packet within the aforementioned at least one random phase-delay packet (e.g. another one of the plurality of random phase-delay packets) by detecting the next random phase-delay packet in the next packet detection window.

In another example, the wireless charging device such as the transmitter pad 20 is arranged to wirelessly charge the electronic device and another electronic device (e.g. a copy of the electronic device) at the same time. When it is detected that data collision exists in this packet detection window, the wireless charging device may discard information obtained from the specific random phase-delay packet mentioned above.

According to some embodiments of the present invention, a packet with random delay, such as any packet within the aforementioned at least one random phase-delay packet, can be sent per slot time by the electronic device, where the slot time mentioned above may represent the time interval of a time slot such as that mentioned above. For example, a packet detection window such as that mentioned above may have a size that is typically larger than or equal to twice the slot time, and can be set as a valid power control loop of the wireless power transfer system 200. This is for illustrative purposes only, and is not meant to be a limitation of the present invention. In another example, a packet detection window such as that mentioned above may have a size that is typically larger than or equal to the slot time, and can be set as a valid power control loop of the wireless power transfer system 200.

In practice, the wireless power transfer system 200 (more particularly, the transmitter pad 20) can determine a power control loop of the wireless power transfer system 200 to be valid when each packet of the packets (e.g. random phase-delay packets) sent from multiple devices that are wirelessly charged at the same time (e.g. the aforementioned multiple copies of the electronic device that are wirelessly charged by the transmitter pad 20 at the same time) can be correctly decoded. In addition, a proper power up amount (e.g. the increment of the wireless charging power) or a proper power down amount (e.g. the decrement of the wireless charging power) can be determined by the wireless power transfer system 200 (more particularly, the transmitter pad 20) through collected information obtained from these devices in a valid power control loop, such as the aforementioned power control loop that is determined to be valid.

Please note that, by checking whether any decoding error of the packets obtained in a power control loop such as that mentioned above exists, the wireless power transfer system 200 (more particularly, the transmitter pad 20) can determine whether data collision happens. For example, when a decoding error exists in this power control loop, the wireless power transfer system 200 (more particularly, the transmitter pad 20) determines that data collision happens. Once data collision happens in this power control loop, which can be known as an error decoding (or erroneous decoding), the wireless power transfer system 200 (more particularly, the transmitter pad 20) typically omits the prior information decoded in the same packet detection window and determines this power control loop to become invalid. For example, the power control action will be suspended for saving time, and the wireless charging device such as the transmitter pad 20 immediately aborts using this packet detection window as described above, and more particularly, skips this packet detection window immediately, for example. By generating a new packet detection window such as the next packet detection window mentioned above, the wireless power transfer system 200 (more particularly, the transmitter pad 20) may resume the associated wireless charging control operations and regain the power control action gain, while the next power control loop may be valid.

Figure 4:
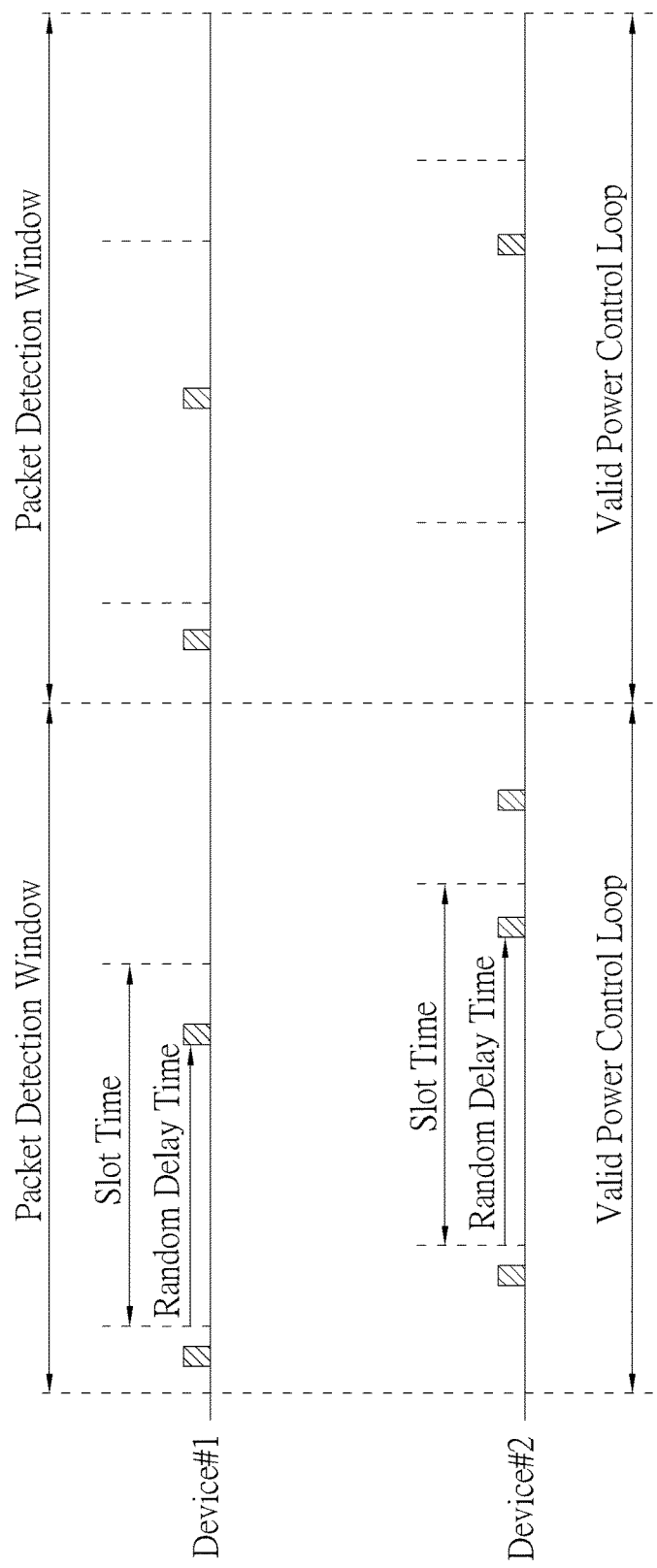
FIG. 4 illustrates a control scheme involved with the method shown in FIG. 3 according to an embodiment of the present invention.

FIG. 4 illustrates a control scheme involved with the method 300 shown in FIG. 3 according to an embodiment of the present invention, where the two devices Device#1 and Device#2 shown in FIG. 4, such as two copies of the aforementioned electronic device, are wirelessly charged by the transmitter pad 20 at the same time.

According to this embodiment, in a situation where the device Device#1 shown in FIG. 4 is taken as an example of the electronic device mentioned above, the first row of shaded blocks in the timing chart of the device Device#1 can be taken as an example of the plurality of random phase-delay packets mentioned above, and the associated series of time slots used by the device Device#1 can be continuous and periodical, where the period of these periodical time slots is labeled "Slot Time" in FIG. 4. For the device Device#1, the phase-delay of the aforementioned each random phase-delay packet can be defined as the delay amount of the beginning of this random phase-delay packet, measured from the beginning of the corresponding time slot, and can be labeled "Random Delay Time" in FIG. 4. In addition, in a situation where the device Device#2 shown in FIG. 4 is taken as an example of the electronic device mentioned above, the second row of shaded blocks in the timing chart of the device Device#2 can be taken as an example of the plurality of random phase-delay packets mentioned above, and the associated series of time slots used by the device Device#2 can be continuous and periodical, where the period of these periodical time slots is labeled "Slot Time" in FIG. 4. For the device Device#2, the phase-delay of the aforementioned each random phase-delay packet can be defined as the delay amount of the beginning of this random phase-delay packet, measured from the beginning of the corresponding time slot, and can be labeled "Random Delay Time" in FIG. 4. As shown in FIG. 4, a packet detection window may be equal to double slot time (i.e. twice the slot time), and will be regarded as a valid power control loop when each packet in this packet detection window is decoded correctly. For brevity, similar descriptions for this embodiment are not repeated in detail here.

Figure 5:
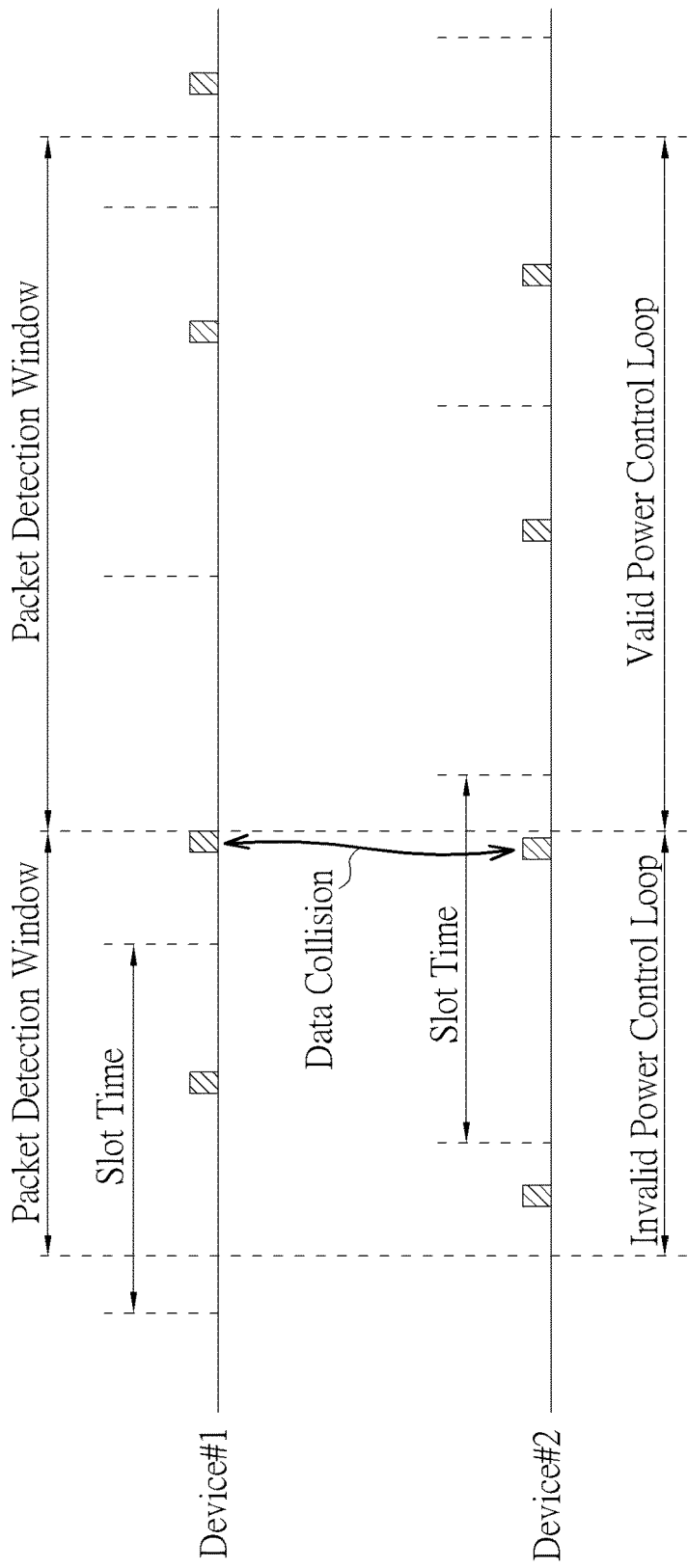
FIG. 5 illustrates a control scheme involved with the method shown in FIG. 3 according to another embodiment of the present invention.

FIG. 5 illustrates a control scheme involved with the method 300 shown in FIG. 3 according to another embodiment of the present invention, where the two devices Device#1 and Device#2 shown in FIG. 5, such as two copies of the aforementioned electronic device, are wirelessly charged by the transmitter pad 20 at the same time.

According to this embodiment, in a situation where the device Device#1 shown in FIG. 5 is taken as an example of the electronic device mentioned above, the first row of shaded blocks in the timing chart of the device Device#1 can be taken as an example of the plurality of random phase-delay packets mentioned above, and the associated series of time slots used by the device Device#1 can be continuous and periodical, where the period of these periodical time slots is labeled "Slot Time" in FIG. 5. For the device Device#1, the phase-delay of the aforementioned each random phase-delay packet can be defined as the delay amount of the beginning of this random phase-delay packet, measured from the beginning of the corresponding time slot, and can be labeled "Random Delay Time" in FIG. 5. In addition, in a situation where the device Device#2 shown in FIG. 5 is taken as an example of the electronic device mentioned above, the second row of shaded blocks in the timing chart of the device Device#2 can be taken as an example of the plurality of random phase-delay packets mentioned above, and the associated series of time slots used by the device Device#2 can be continuous and periodical, where the period of these periodical time slots is labeled "Slot Time" in FIG. 5. For the device Device#2, the phase-delay of the aforementioned each random phase-delay packet can be defined as the delay amount of the beginning of this random phase-delay packet, measured from the beginning of the corresponding time slot, and can be labeled "Random Delay Time" in FIG. 5. As shown in FIG. 5, once data collision in a power control loop happens, triggering a decoding error corresponding to this power control loop, the prior information decoded in the same packet detection window will be omitted and this power control loop will become invalid. In practice, the power control action will be suspended until a subsequent power control loop such as the next power control loop is determined to be valid, while at least one new packet detection window (e.g. one or more new packet detection windows) may be generated. For brevity, similar descriptions for this embodiment are not repeated in detail here.

According to an embodiment, such as a variation of the embodiment shown in FIG. 5, as the power control loop under consideration may switch from the original power control loop (e.g. the power control loop shown around the leftmost of FIG. 5) to the aforementioned subsequent power control loop such as the next power control loop (e.g. the power control loop shown around rightmost of FIG. 5), the power control action can be suspended until the power control loop under consideration becomes valid. For brevity, similar descriptions for this embodiment are not repeated in detail here.

Figure 6:
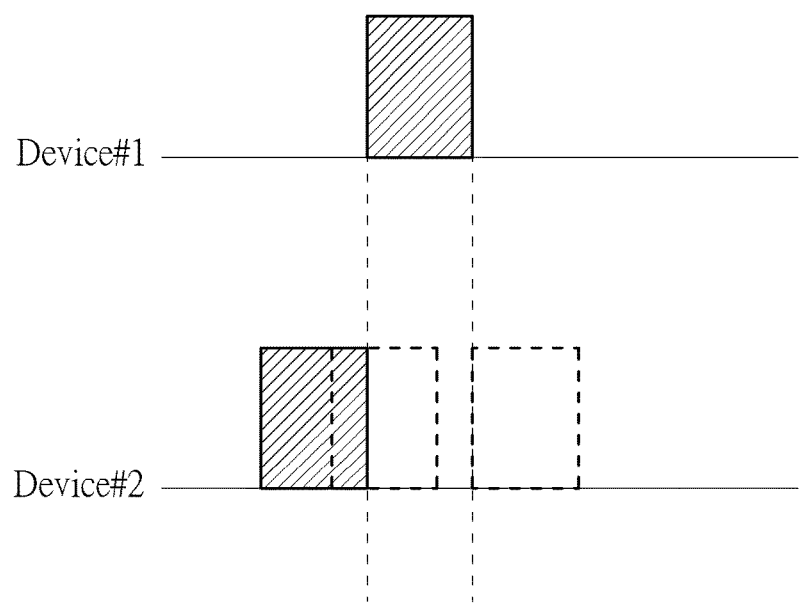
FIG. 6 illustrates a scenario of two devices involved with the method shown in FIG. 3 according to an embodiment of the present invention.

FIG. 6 illustrates a scenario of two devices involved with the method 300 shown in FIG. 3 according to an embodiment of the present invention, where the two devices Device#1 and Device#2 shown in FIG. 6, such as two copies of the aforementioned electronic device, are wirelessly charged by the transmitter pad 20 at the same time.

According to this embodiment, the probability of data collision between two packets of the two devices Device#1 and Device#2, such as a random phase-delay packet from the device Device#1 and a random phase-delay packet from the device Device#2, may be calculated as follows. Suppose that the length of each of the aforementioned two packets of the two devices Device#1 and Device#2 on the time axis is equal to 10 milliseconds (ms), and that the aforementioned slot time such as the period of the series of time slots is equal to 100 ms. In a situation where the random delay unit is equal to 1 ms, the data collision probability $P_{DATA\ COLLISION}$ (Device#1, Device#2) of the two devices Device#1 and Device#2 in a single slot time can be expressed as follows:

$$P_{DATA\ COLLISION}(\text{Device\#1}, \text{Device\#2}) = (20/100) = 0.2;$$

where some assumptions may be applied. This is for illustrative purposes only, and is not meant to be a limitation of the present invention. In some other examples, at least one portion (e.g. a portion or all) of the length of each of the aforementioned two packets of the two devices Device#1 and Device#2 on the time axis, the aforementioned slot time such as the period of the series of time slots, and the random delay unit (e.g. the length of the random phase-delay packet from the device Device#1, the length of the random phase-delay packet from the device Device#2, the aforementioned slot time such as the period of the series of time slots, and/or the random delay unit) may be varied.

For better comprehension, regarding the above calculation, the random phase-delay packet from the device Device#1 can be illustrated to be located at a random time point on the timing chart of the device Device#1, and the location of the random phase-delay packet from the device Device#2 on the timing chart of the device Device#2 can be illustrated to be variable, from one random time point to another random time point on the timing chart of the device Device#2, in different situations. This is for illustrative purposes only, and is not meant to be a limitation of the present invention. According to a variation of this embodiment, the random phase-delay packet from the device Device#2 can be illustrated to be located at a random time point on the timing chart of the device Device#2, and the location of the random phase-delay packet from the device Device#1 on the timing chart of the device Device#1 can be illustrated to be variable, from one random time point to another random time point on the timing chart of the device Device#1, in different situations.

Figure 7:
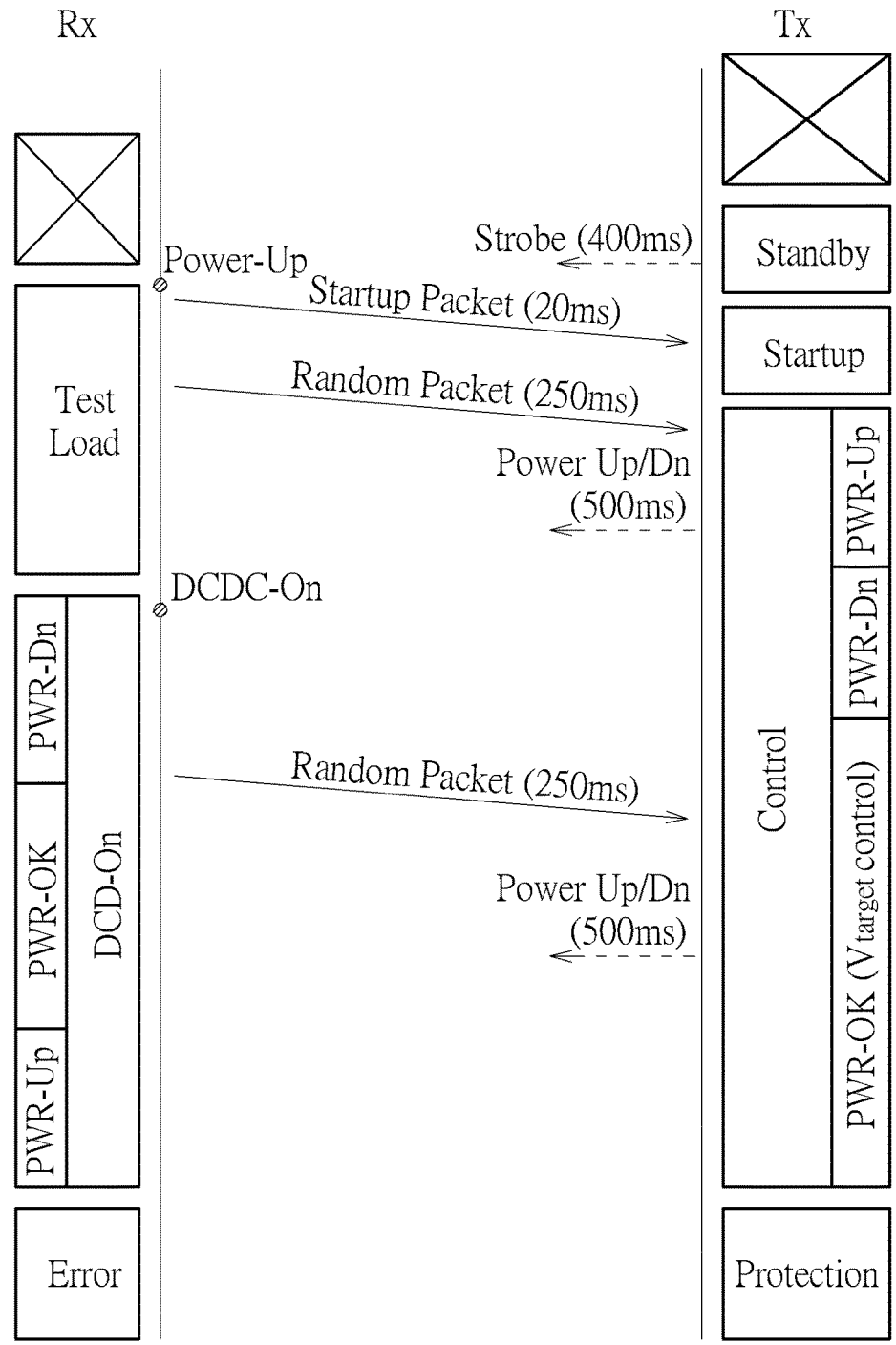
FIG. 7 illustrates a control scheme involved with the method shown in FIG. 3 according to an embodiment of the present invention.

FIG. 7 illustrates a control scheme involved with the method 300 shown in FIG. 3 according to an embodiment of the present invention, where the notation Tx may represent a transmitter in the wireless power transfer system 200, such as the aforementioned wireless charging device (e.g. the transmitter pad 20), and the notation Rx may represent a receiver in the wireless power transfer system 200, such as the electronic device mentioned above.

According to this embodiment, the arrows illustrated with dashed lines, such as those labeled "Strobe", "Power Up/Dn" (which means "Power Up" or "Power Dn"), etc. can be regarded as signals of the power control action mentioned above, and each of the strobe signal Strobe, the power up signal "Power Up", and the power down signal "Power Dn" does not comprise any packet, and is not involved with packet transmission. For example, the length of the strobe signal Strobe of this embodiment may be equal to 400 ms, and the length of any of the power up signal "Power Up" and the power down signal "Power Dn" in this embodiment may be equal to 500 ms. In addition, the arrows illustrated with non-dashed lines, such as those labeled "Startup Packet", "Random Packet", etc. can be regarded as the packets sent from the receiver Rx, where the startup packet can be utilized for notifying the transmitter Tx of the startup of the receiver Rx, and the random packets can be regarded as an example of the plurality of random phase-delay packets mentioned above. For example, the length of the startup packet of this embodiment may be equal to 20 ms, and the length of any of the random packets in this embodiment may be equal to 250 ms.

As shown in FIG. 7, the strobe signal Strobe may trigger the receiver Rx to enter the power up status (e.g. the circle labeled "Power-Up" in FIG. 7, for brevity), and the receiver Rx turns on the main power for the controller 110 to allow the controller 110 to perform wireless charging control, and starts the wireless charging control phase "Test Load" for testing the load coupled to the wireless charging receiver 100R within the receiver Rx. Afterward, the receiver Rx may enter the DC-DC on status (e.g. the circle labeled "DCDC-On" in FIG. 7, for brevity) and start the wireless charging control phase "DCDC-On" shown around the lower left of FIG. 7 to perform associated operations regarding wireless charging control, where different conditions such as the power down condition PWR-Dn, the power OK condition PWR-OK, and the power up condition PWR-Up may be encountered by the receiver Rx. In addition, as shown around the upper right of FIG. 7, the transmitter Tx may initially stay in a standby status. Afterward, when receiving the startup packet from the receiver Rx, the transmitter Tx may enter the wireless charging control phase "Startup" shown around the upper right of FIG. 7 to perform initialization. Then, the transmitter Tx may enter the wireless charging control phase "Control" shown around the lower right of FIG. 7 to perform associated operations regarding wireless charging control, where different conditions such as the power up condition PWR-Up, the power down condition PWR-Dn, and the power OK condition PWR-OK may be encountered by the transmitter Tx, and the latter may be associated with target voltage control (labeled "$V_{target}$ control" in FIG. 7, for brevity). For example, the receiver Rx may detect an error and enter the wireless charging control phase "Error", and the transmitter Tx may enter the wireless charging control phase "Protection" to perform an associated protection operation. For brevity, similar descriptions for this embodiment are not repeated in detail here.

According to some embodiments, such as one or more of the following embodiments, the wireless power transfer system 200 may comprise the plurality of copies of the wireless charging receiver 100R, such as the wireless charging receivers {100R} of the aforementioned multiple copies of the electronic device that may be wirelessly charged by the transmitter pad 20 at the same time. For example, in a situation where the number of wireless charging receivers {100R} is over four, fixed timing slot may be not suitable for system control since there may be too many data collisions. Thus, in at least one portion (e.g. a portion or all) of these embodiments, a method for performing wireless charging control of an electronic device with aid of variant slot timing may be utilized for solving this problem.

Figure 8:
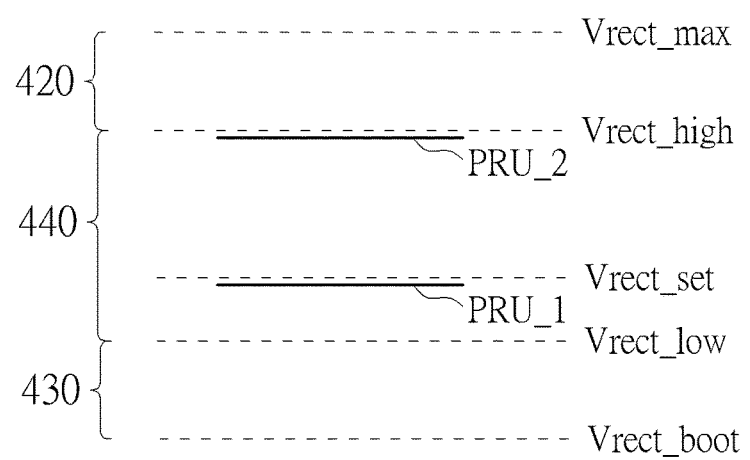
FIG. 8 illustrates a dynamic system control scheme involved with the method shown in FIG. 3 according to an embodiment of the present invention.

FIG. 8 illustrates a dynamic system control scheme involved with the method 300 shown in FIG. 3 according to an embodiment of the present invention. For example, the dynamic system control scheme may be applied to multiple receivers {Rx} such as a plurality of power receiving units (PRUs) PRU_1 and PRU_2, to dynamically control each of the receivers {Rx} (e.g. each of the PRUs PRU_1 and PRU_2) according to a set of voltage control parameters such as some predetermined voltage thresholds Vrect_max, Vrect_high, Vrect_set, Vrect_low, and Vrect_boot, where each of the receivers {Rx} may comprise a copy of the wireless charging receiver 100R shown in FIG. 2, and the predetermined voltage thresholds Vrect_max, Vrect_high, Vrect_set, Vrect_low, and Vrect_boot can be predetermined parameters for monitoring the DC voltage level Vrect. As shown in FIG. 8, Vrect_max>Vrect_high>Vrect_set>Vrect_low>Vrect_boot. Please note that the scale regarding the predetermined voltage thresholds Vrect_max, Vrect_high, Vrect_set, Vrect_low, and Vrect_boot shown in FIG. 8 may vary in some embodiments. In addition, for better comprehension, the plurality of PRUs PRU_1 and PRU_2 may be taken as an example of the receivers {Rx}. This is for illustrative purposes only, and is not meant to be a limitation of the present invention. According to some embodiments, implementation of the receivers {Rx} may vary.

For each of the PRUs PRU_1 and PRU_2, malfunction may occur if the DC voltage level Vrect thereof is greater than the predetermined voltage threshold Vrect_max or is less than the predetermined voltage threshold Vrect_boot, and it is dangerous if the DC voltage level Vrect thereof is greater than the predetermined voltage threshold Vrect_high or is less than the predetermined voltage threshold Vrect_low. According to some embodiments, such as the embodiment shown in FIG. 8 and the subsequent embodiments, the apparatus 100 (more particularly, the controller 110) may determine whether the DC voltage level Vrect falls within any of the predetermined voltage ranges 420, 440, and 430 defined by the predetermined voltage thresholds Vrect_max, Vrect_high, Vrect_set, Vrect_low, and Vrect_boot, to generate a series of detection results with respect to time, where the predetermined voltage ranges 420, 440, and 430 may correspond to the power down condition PWR-Dn, the power OK condition PWR-OK, and the power up condition PWR-Up, respectively. In addition, the apparatus 100 (more particularly, the controller 110) may send a series of wireless charging reports (e.g. the aforementioned at least one wireless charging report) carrying instruction information with respect to time, to notify the wireless charging device (e.g. the transmitter pad 20) of associated statuses such as the power down condition PWR-Dn, the power OK condition PWR-OK, and the power up condition PWR-Up. As a result, the wireless charging device (e.g. the transmitter pad 20) may perform corresponding operations such as decreasing charging power, maintain charging power, and increasing charging power, respectively.

As shown in FIG. 8, suppose that each of the DC voltage level Vrect of the PRU PRU_1 and the DC voltage level Vrect of the PRU PRU_2 falls within the predetermined voltage range 440 at a specific time point, and that the DC voltage level Vrect of the PRU PRU_1 is close to the predetermined voltage threshold Vrect_set while the DC voltage level Vrect of the PRU PRU_2 is close to the predetermined voltage threshold Vrect_high at the specific time point. In a situation where the DC voltage level Vrect of the PRU PRU_1 is kept stable and the DC voltage level Vrect of the PRU PRU_2 increases and then falls within the predetermined voltage range 420 at a next time point, it is dangerous for the PRU PRU_2, rather than the PRU PRU_1. According to the dynamic system control scheme, by assigning different slot times corresponding to different predetermined voltage ranges, the power control over the PRU PRU_2 that is in danger may have higher priority than the power control over the PRU PRU_1 that is not in danger. For example, the slot time corresponding to the predetermined voltage range 440 can be greater than the slot time corresponding to each of the predetermined voltage ranges 420 and 430. As a result, the random packet containing the wireless charging report sent by the PRU PRU_2 is less likely to be collided in the current packet detection window, and the power control over the PRU PRU_2 that is in danger can be performed immediately and therefore the DC voltage level Vrect of the PRU PRU_2 can be drawn back to the predetermined voltage range 440 in time.

According to some embodiments, the predetermined voltage thresholds Vrect_max, Vrect_high, Vrect_set, Vrect_low, and Vrect_boot can be 17.5 Volt (V), 15.0 V, 9.0 V, 7.0 V, and 4.0 V. This is for illustrative purposes only, and is not meant to be a limitation of the present invention.

Figure 9:
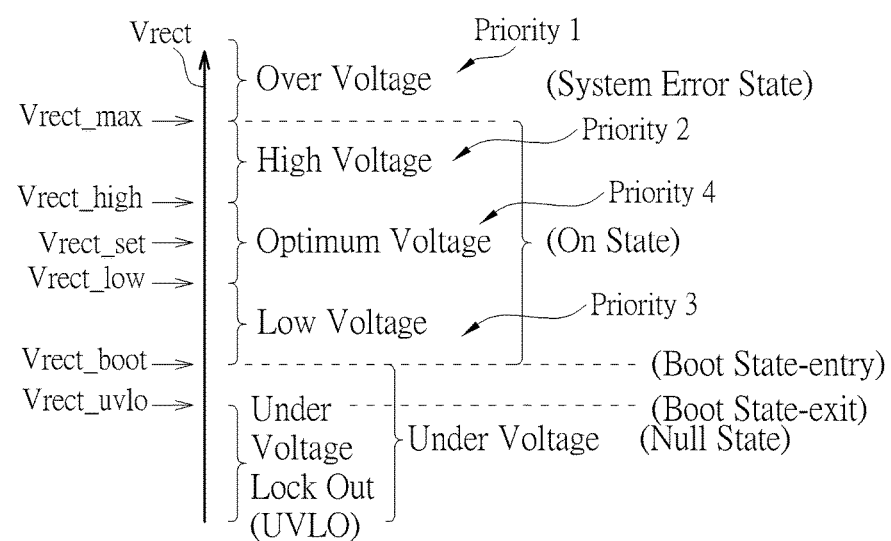
FIG. 9 illustrates a priority-based system control scheme involved with the method shown in FIG. 3 according to an embodiment of the present invention.

FIG. 9 illustrates a priority-based system control scheme involved with the method 300 shown in FIG. 3 according to an embodiment of the present invention. In addition to the dynamic system control scheme shown in FIG. 8, some implementation details regarding charging control respectively corresponding to different degrees of priority, such as the first priority (e.g. Priority 1), the second priority (e.g. Priority 2), the third priority (e.g. Priority 3), and the fourth priority (e.g. Priority 4), can be further applied to the apparatus 100 in this embodiment.

As shown in FIG. 9, in addition to the predetermined voltage thresholds Vrect_max, Vrect_high, Vrect_set, Vrect_low, and Vrect_boot, the set of voltage control parameters mentioned in the embodiment shown in FIG. 8 may further comprise a predetermined voltage threshold Vrect_uvlo, where Vrect_boot>Vrect_uvlo, in which the suffix "uvlo" stands for under voltage lock out (UVLO). The thresholds Vrect_max, Vrect_high, Vrect_set, Vrect_low, Vrect_boot, and Vrect_uvlo are illustrated in FIG. 9 to highlight that Vrect_max>Vrect_high>Vrect_set>Vrect_low>Vrect_boot>Vrect_uvlo. This is for illustrative purposes only, and is not meant to be a limitation of the present invention. According to some embodiments, the scale regarding the predetermined voltage thresholds Vrect_max, Vrect_high, Vrect_set, Vrect_low, Vrect_boot, and Vrect_uvlo shown in FIG. 9 may vary.

In addition, the high voltage range, the optimum voltage range, and the low voltage range (which can also be referred to as the high voltage, the optimum voltage, and the low voltage, respectively, for brevity) can be taken as examples of the predetermined voltage ranges 420, 440, and 430 shown in FIG. 8, respectively, and the over voltage range and the under voltage range (which can also be referred to as the over voltage and the under voltage, respectively, for brevity) can be taken as examples of additional predetermined voltage ranges outsides the predetermined voltage ranges 420 and 430 shown in FIG. 8, respectively. According to this embodiment, the high voltage range, the optimum voltage range, and the low voltage range may correspond to an on state of the electronic device, and the over voltage range and the under voltage range may correspond to a system error state and a null state of the electronic device, respectively. As mentioned above, malfunction may occur if the DC voltage level Vrect thereof is greater than the predetermined voltage threshold Vrect_max or is less than the predetermined voltage threshold Vrect_boot, and it is dangerous if the DC voltage level Vrect thereof is greater than the predetermined voltage threshold Vrect_high or is less than the predetermined voltage threshold Vrect_low. In order to achieve the best overall performance of the electronic device with fewer side effects, the apparatus 100 (more particularly, the controller 110) may monitor the DC voltage level Vrect of each of the plurality of PRUs (e.g. the PRUs PRU_1 and PRU_2) and perform charging control respectively corresponding to different degrees of priority, such as the first priority (e.g. Priority 1), the second priority (e.g. Priority 2), the third priority (e.g. Priority 3), and the fourth priority (e.g. Priority 4) respectively corresponding to the over voltage range, the high voltage range, the low voltage range, and the optimum voltage range in response to the DC voltage level Vrect of each of the plurality of PRUs. As a result, the following objectives OBJ(1), OBJ(2), OBJ(3), and OBJ(4) may be achieved in the following order thereof:

OBJ(1): Protect the DC voltage level Vrect of each of the PRU from over-voltage (e.g. in a situation where Vrect>Vrect_max for a PRU of the PRUs, reduce the DC voltage level Vrect of this PRU immediately);

OBJ(2): Reduce the DC voltage level Vrect of a PRU concerned in time such that, after the PRU concerned reports that the DC voltage level Vrect thereof is greater than the predetermined voltage threshold Vrect_high, the DC voltage level Vrect should become less than or equal to the predetermined voltage threshold Vrect_high within a short predetermined period (e.g. five seconds (5 s), or a period of another length of time);

OBJ(3): Ensure that all of the PRUs are provided with optimum power with the DC voltage level Vrect being greater than the predetermined voltage threshold Vrect_min and less than the predetermined voltage threshold Vrect_high, if the first two objectives OBJ(1) and OBJ(2) are satisfied; and OBJ(4): Control the transmitter coil current ITX_COIL of transmitter pad 20 (e.g. a current passing through the power output coil 28), if objectives OBJ(1), OBJ(2) and OBJ(3) are satisfied, to:

OBJ(4-1) Optimize the DC voltage level Vrect of each of the PRUs with the highest percentage utilization of the input power Prect of the power input coil 38, or OBJ(4-2) Maximize the total system efficiency of the wireless power transfer system 200.

For example, in a situation where malfunction of any PRU of the plurality of PRUs due to an abnormal great value of the DC voltage level Vrect may occur right away (e.g. the DC voltage level Vrect of this PRU falls within the over voltage range), the apparatus 100 (more particularly, the controller 110) may save this PRU in real time, since the charging control corresponding to the first priority (e.g. Priority 1) will take effect faster than that respectively corresponding to the second priority (e.g. Priority 2), the third priority (e.g. Priority 3), and the fourth priority (e.g. Priority 4).

In some examples, in a situation where any PRU of the plurality of PRUs is in danger due to a greater value of the DC voltage level Vrect (e.g. the DC voltage level Vrect of this PRU falls within the high voltage range), the apparatus 100 (more particularly, the controller 110) may save this PRU first, as long as none of the other PRUs encounters over-voltage, since the charging control corresponding to the second priority (e.g. Priority 2) will take effect faster than that respectively corresponding to the third priority (e.g. Priority 3) and the fourth priority (e.g. Priority 4).

In some examples, in a situation where any PRU of the plurality of PRUs is in danger due to a lower value of the DC voltage level Vrect (e.g. the DC voltage level Vrect of this PRU falls within the low voltage range), the apparatus 100 (more particularly, the controller 110) may save this PRU first, as long as none of the other PRUs within the plurality of PRUs encounters over-voltage and there is no PRU that is in danger due to the aforementioned greater value of the DC voltage level Vrect, since the charging control corresponding to the third priority (e.g. Priority 3) will take effect faster than that corresponding to the fourth priority (e.g. Priority 4).

According to this embodiment, the predetermined voltage threshold Vrect_boot may represent a voltage threshold for boot state-entry, and the predetermined voltage threshold Vrect_uvlo may represent a voltage threshold for boot state-exit. For example, in a situation where the DC voltage level Vrect is less than the predetermined voltage threshold Vrect_boot (e.g. this situation can be regarded as under voltage), booting up the electronic device is forbidden, and this can be regarded as the UVLO mentioned above.

Figure 10:
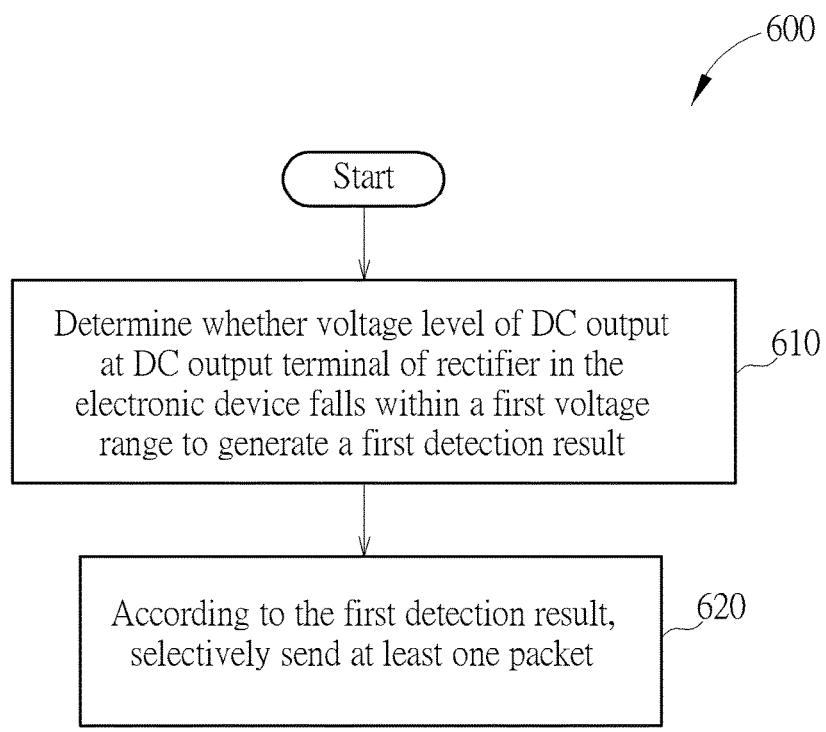
FIG. 10 illustrates a flowchart of a method for performing wireless charging control of an electronic device according to another embodiment of the present invention.

FIG. 10 illustrates a flowchart of a method 600 for performing wireless charging control of an electronic device according to another embodiment of the present invention. The method 600 shown in FIG. 10 can be applied to the apparatus 100 shown in FIG. 1 (more particularly, the wireless power transfer system 200 of the embodiment shown in FIG. 2), and can be applied to the controller 110 thereof. The method can be described as follows.

In Step 610, the controller 110 determines whether a voltage level of the DC output at the DC output terminal T21 of the rectifier 50 in the electronic device, such as the DC voltage level Vrect, falls within a first voltage range to generate a first detection result. For example, the controller 110 determine whether the voltage level of the DC output at the DC output terminal T21 of the rectifier 50 in the electronic device is greater than a first voltage threshold to generate the first detection result, where the first voltage threshold may be associated to the first voltage range, and more particularly, may be an upper bound or a lower bound of the first voltage range.

In Step 620, according to the first detection result, the controller 110 utilizes the communications module 130 to selectively send at least one packet (e.g. one or more packets), where the aforementioned at least one packet is utilized for carrying information of at least one wireless charging report of the electronic device. Examples of the aforementioned at least one packet may include, but not limited to, at least one random phase-delay packet (e.g. one or more random phase-delay packets), where each random phase-delay packet of the aforementioned at least one random phase-delay packet has a random phase-delay with respect to a time slot (e.g. a corresponding time slot), and the aforementioned at least one random phase-delay packet is utilized for carrying information of at least one wireless charging report (e.g. one or more wireless charging reports) of the electronic device.

Regarding selectively sending the aforementioned at least one packet in Step 620, "selectively" may highlight the selective options of sending or not sending the aforementioned at least one packet. Thus, according to the first detection result, the controller 110 may determine whether to send the aforementioned at least one packet or not. For example, when the first detection result indicates that the voltage level falls within the first voltage range, the controller 110 may utilize the communications module 130 to send the aforementioned at least one packet. In another example, when the first detection result indicates that the voltage level falls outside the first voltage range, the controller 110 may prevent the communications module 130 from sending the aforementioned at least one packet. This is for illustrative purposes only, and is not meant to be a limitation of the present invention. According to some embodiments, as the controller 110 may operate according to the first detection result, whether to send the aforementioned at least one packet may correspond to whether the first detection result indicates that the voltage level falls within the first voltage range.

In this embodiment, according to the first detection result, the controller 110 may utilize the communications module 130 to selectively send the aforementioned at least one random phase-delay packet (e.g. one or more random phase-delay packets) to the wireless charging device such as the transmitter pad 20, without obtaining information from the wireless charging device through any packet. For example, the wireless charging device does not send any packet to the electronic device, and the wireless charging device may simply receive the aforementioned at least one random phase-delay packet. In some examples, according to the first detection result, the controller 110 may utilize the communications module 130 to selectively send the aforementioned at least one packet such as the aforementioned at least one random phase-delay packet (e.g. one or more random phase-delay packets) to the wireless charging device such as the transmitter pad 20, without receiving a packet from the wireless charging device. Therefore, the present invention method and the associated apparatus (e.g. the method 600 and the apparatus 100) can keep power control loops of the wireless power transfer system 200 working by a simple one way communications control scheme, free from any dual way communications regulation, where power consumption can be reduced when the wireless charging device such as the transmitter pad 20 is not transmitting any modulation signal (e.g. the wireless charging). In comparison with the related art, the present invention method and the associated apparatus can guarantee the overall performance, and the related art problems (e.g. the problem of increased costs, and the problem of insufficiency of the channels within the frequency band) can be prevented.

According to some embodiments, in a situation where the first detection result indicates that the voltage level of the DC output (e.g. the DC voltage level Vrect) does not fall within the first voltage range, and more particularly, is not greater than the first voltage threshold, the controller 110 may determine at least one random value such as that mentioned above for controlling timing of packet transmission regarding the aforementioned at least one wireless charging report of Step 620. In addition, based on the aforementioned at least one random value (more particularly, the aforementioned at least one random value that is determined in Step 310), the controller 110 may utilize the communications module 130 to send the aforementioned at least one packet (e.g. the at least one packet with a random phase delay with respect to a time slot) such as the aforementioned at least one random phase-delay packet of Step 620 to the wireless charging device (e.g. the transmitter pad 20), to trigger an associated wireless charging control operation of the wireless charging device. Thus, in this situation, the aforementioned at least one random phase-delay packet of Step 620 may represent the aforementioned at least one random phase-delay packet of Step 320.

According to some embodiments, the controller 110 may determine whether the voltage level of the DC output (e.g. the DC voltage level Vrect) falls within a second voltage range. In addition, determining whether the voltage level of the DC output (e.g. the DC voltage level Vrect) falls within the first voltage range may have higher priority than determining whether the voltage level of the DC output falls within the second voltage range, where the former and the latter may correspond to the first priority (e.g. Priority 1) and the second priority (e.g. Priority 2) mentioned in the embodiment shown in FIG. 9, respectively.

According to some embodiments, the controller 110 may determine whether the voltage level of the DC output (e.g. the DC voltage level Vrect) falls within the second voltage range to generate a second detection result. In addition, according to the first and the second detection results, the controller 110 may control a slot time for a packet being sent as a first predetermined slot time corresponding to the first voltage range or a second predetermined slot time corresponding to the second voltage range. For example, the second predetermined slot time may be greater than or equal to the first predetermined slot time.

According to some embodiments, the first voltage threshold may be between a first predetermined voltage range (e.g. the first voltage range mentioned above) and a second predetermined voltage range (e.g. the second voltage range mentioned above) within a plurality of predetermined voltage ranges, wherein the first predetermined voltage range is above the second predetermined voltage range. For example, the plurality of predetermined voltage ranges may comprise the over voltage range, the high voltage range, the optimum voltage range, and the low voltage range, and the under voltage range mentioned in the embodiment shown in FIG. 9, and the first predetermined voltage and the second predetermined voltage range may represent the over voltage range and the high over voltage range, respectively. In addition, the controller 110 may determine whether the voltage level of the DC output (e.g. the DC voltage level Vrect) falls within one of the plurality of predetermined voltage ranges to generate at least one detection result (e.g. one or more detection results), where the aforementioned at least one detection result may comprise the first detection result. According to one or more of these embodiments, determining whether the voltage level of the DC output (e.g. the DC voltage level Vrect) falls within the first predetermined voltage range may have higher priority than determining whether the voltage level of the DC output falls within the second predetermined voltage range, where the former and the latter may correspond to the first priority (e.g. Priority 1) and the second priority (e.g. Priority 2) mentioned in the embodiment shown in FIG. 9, respectively.

According to some embodiments, according to the aforementioned at least one detection result (e.g. one or more detection results), the controller 110 may control a slot time for a packet being sent as a predetermined slot time (e.g. 25 milliseconds (ms), or a period of another length of time) corresponding to the aforementioned one of the plurality of predetermined voltage ranges. For one example, in a situation where the voltage level of the DC output (e.g. the DC voltage level Vrect) falls within the first predetermined voltage range, the controller 110 may control a slot time for a first packet being sent as a first predetermined slot time (e.g. 25 ms, or a period of another length of time) corresponding to the first predetermined voltage range, such as the first predetermined slot time corresponding to the first voltage range in some of the above embodiments. For another example, in a situation where the voltage level of the DC output (e.g. the DC voltage level Vrect) falls within the second predetermined voltage range, the controller 110 may control a slot time for a second packet being sent as a second predetermined slot time (e.g. 250 ms, or a period of another length of time) corresponding to the second predetermined voltage range, such as the second predetermined slot time corresponding to the second voltage range in some of the above embodiments, where the second predetermined slot time may be greater than the first predetermined slot time.

According to some embodiments, the plurality of predetermined voltage ranges may comprise a third predetermined voltage range such as the low voltage range mentioned in the embodiment shown in FIG. 9, where the second predetermined voltage range is above the third predetermined voltage range. For example, in a situation where the voltage level of the DC output (e.g. the DC voltage level Vrect) falls within the third predetermined voltage range, the controller 110 may control a slot time for a third packet being sent as a third predetermined slot time (e.g. 250 ms, or a period of another length of time) corresponding to the third predetermined voltage range, where the third predetermined slot time may be equal to the second predetermined slot time. According to one or more of these embodiments, determining whether the voltage level of the DC output (e.g. the DC voltage level Vrect) falls within the second predetermined voltage range has higher priority than determining whether the voltage level of the DC output falls within the third predetermined voltage range, where the former and the latter may correspond to the second priority (e.g. Priority 2) and the third priority (e.g. Priority 3) mentioned in the embodiment shown in FIG. 9, respectively.

According to some embodiments, the plurality of predetermined voltage ranges may comprise a fourth predetermined voltage range such as the optimum voltage range mentioned in the embodiment shown in FIG. 9, where the fourth predetermined voltage range is between the second predetermined voltage range and the third predetermined voltage range. For example, in a situation where the voltage level of the DC output (e.g. the DC voltage level Vrect) falls within the fourth predetermined voltage range, the controller 110 may control a slot time for a fourth packet being sent as a fourth predetermined slot time (e.g. 2000 ms, or a period of another length of time) corresponding to the fourth predetermined voltage range, where the fourth predetermined slot time may be greater than the third predetermined slot time. According to one or more of these embodiments, determining whether the voltage level of the DC output (e.g. the DC voltage level Vrect) falls within the third predetermined voltage range has higher priority than determining whether the voltage level of the DC output falls within the fourth predetermined voltage range, where the former and the latter may correspond to the third priority (e.g. Priority 3) and the fourth priority (e.g. Priority 4) mentioned in the embodiment shown in FIG. 9, respectively.

Figure 11:
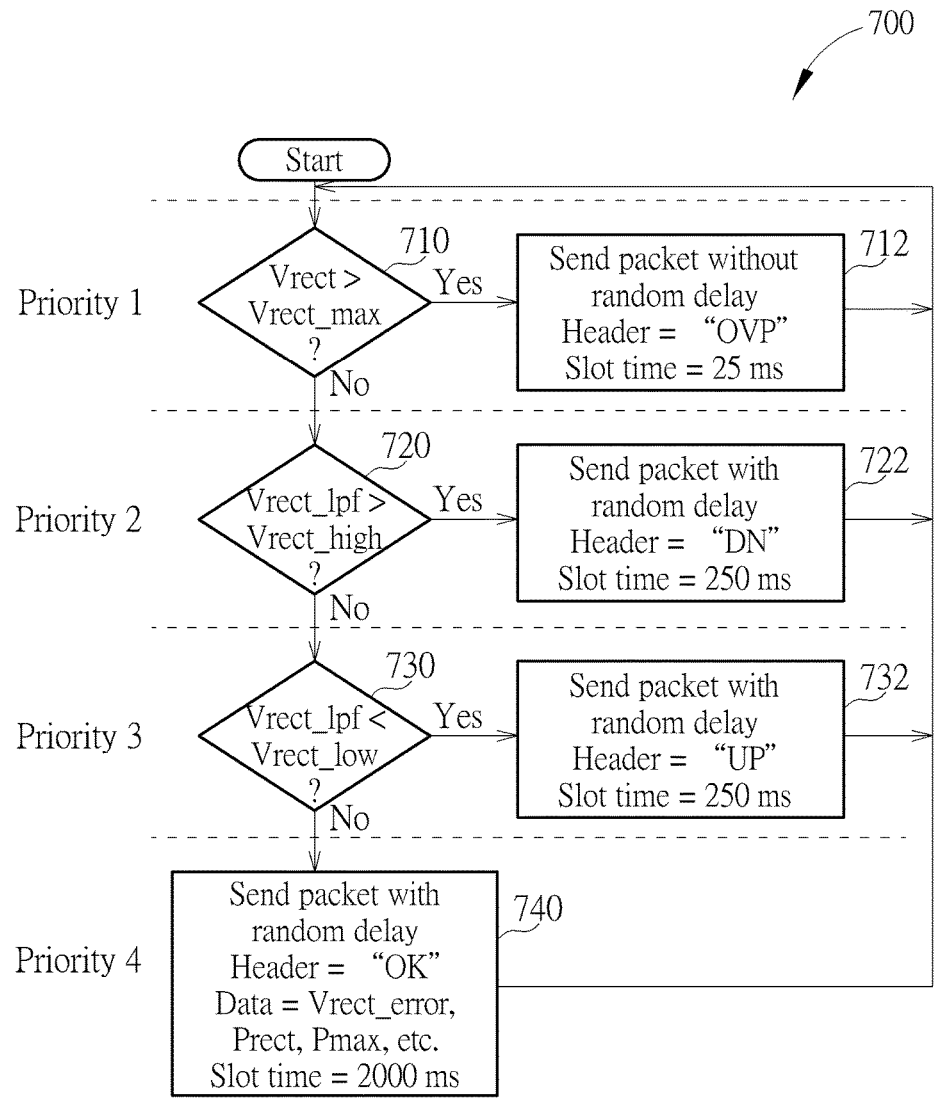
FIG. 11 illustrates a working flow involved with the method shown in FIG. 10 according to an embodiment of the present invention.

FIG. 11 illustrates a working flow 700 involved with the method 600 shown in FIG. 10 according to an embodiment of the present invention, where the working flow 700 may be applied to each PRU of the plurality of PRUs (e.g. the PRUs PRU_1 and PRU_2).

In Step 710, the controller 110 may check whether the DC voltage level Vrect is greater than the predetermined voltage threshold Vrect_max to generate the first detection result, where the predetermined voltage threshold Vrect_max can be taken as an example of the first voltage threshold. When the first detection result indicate that Vrect>Vrect_max, Step 712 is entered; otherwise, Step 720 is entered.

In Step 712, the controller 110 may send a packet without random delay, and control the associated header to carry a predetermined header content "OVP" indicating an over-voltage condition OVP and further control the associated slot time (such as that for the aforementioned first packet being sent) to be 25 ms.

In Step 720, the controller 110 may check whether a low pass filtered version Vrect_lpf of the DC voltage level Vrect is greater than the predetermined voltage threshold Vrect_high to generate a second detection result within the aforementioned at least one detection result. For example, the low pass filtered version Vrect_lpf of the DC voltage level Vrect may be obtained from performing moving average on a series of historical values of the DC voltage level Vrect. This is for illustrative purposes only, and is not meant to be a limitation of the present invention. According to some variations of this embodiment, the low pass filtered version Vrect_lpf of the DC voltage level Vrect may be obtained from another method. When the second detection result indicate that Vrect_lpf>Vrect_high, Step 722 is entered; otherwise, Step 730 is entered.

In Step 722, the controller 110 may send a packet with random delay (e.g. a packet within the aforementioned at least one random phase-delay packet of Step 620), and control the associated header to carry a predetermined header content "DN" indicating the power down condition PWR-Dn and further control the associated slot time (such as that for the aforementioned second packet being sent) to be 250 ms.

In Step 730, the controller 110 may check whether the low pass filtered version Vrect_lpf of the DC voltage level Vrect is less than the predetermined voltage threshold Vrect_low to generate a third detection result within the aforementioned at least one detection result. When the third detection result indicate that Vrect_lpf<Vrect_low, Step 732 is entered; otherwise, Step 740 is entered.

In Step 732, the controller 110 may send a packet with random delay (e.g. a packet within the aforementioned at least one random phase-delay packet of Step 620), and control the associated header to carry a predetermined header content "UP" indicating the power up condition PWR-Up and further control the associated slot time (such as that for the aforementioned third packet being sent) to be 250 ms.

In Step 740, the controller 110 may send a packet with random delay (e.g. a packet within the aforementioned at least one random phase-delay packet of Step 620), and control the associated header to carry a predetermined header content "OK" indicating the power OK condition PWR-OK and control the associated data to comprise some parameters such as Vrect_error (which may represent the rectifier voltage error, i.e. the error of the DC voltage level Vrect), Prect (which may represent the output power of the rectifier 50), Pmax (which may represent the maximum power available for the rectifier 50), etc., and further control the associated slot time (such as that for the aforementioned fourth packet being sent) to be 2000 ms.

According to some embodiments, in a situation where the aforementioned transmitter coil current ITX_COIL of transmitter pad 20 is kept at the transmitter nominal current Itx_nominal, the PRU concerned will be regulated as the fourth priority "Priority 4" by a conformance test. In addition, this PRU (more particularly, the controller 110 thereof) may enable the power output initially if it is not supporting a power adjusting function in one or more of these embodiments.

Figure 12:
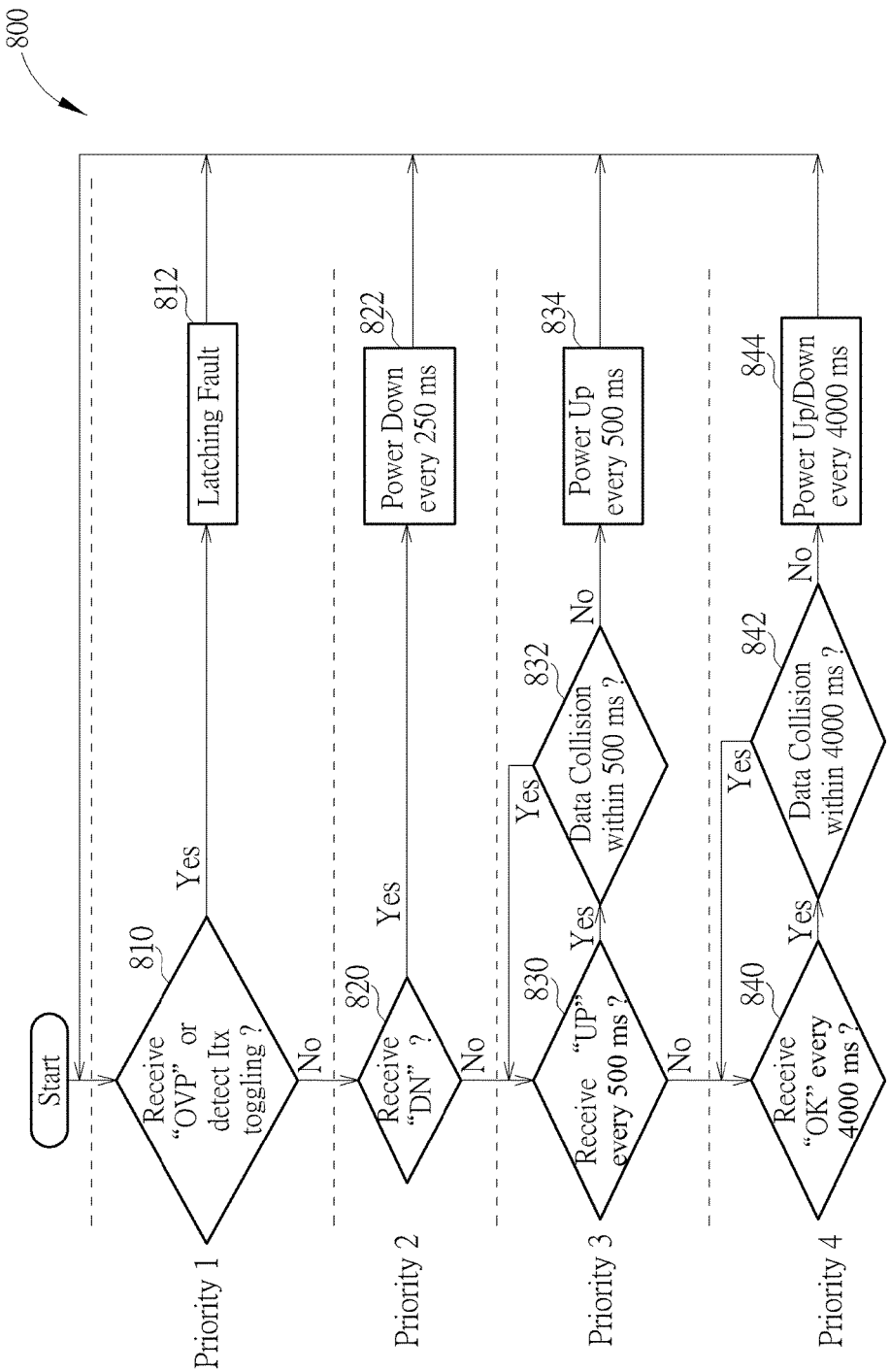
FIG. 12 illustrates a working flow involved with the method shown in FIG. 10 according to another embodiment of the present invention.

FIG. 12 illustrates a working flow 800 involved with the method 600 shown in FIG. 10 according to another embodiment of the present invention, where the working flow 800 may be applied to the transmitter Tx such as a power transmitting unit (PTU) (e.g. the wireless charging device such as the transmitter pad 20), and more particularly, can be applied to the control circuit of the transmitter Tx such as the PTU (e.g. the control circuit within the wireless charging device such as the transmitter pad 20). For example, the PTU may receive a packet such as that sent in a step within Step 712, Step 722, Step 732, and Step 740 in the working flow 700 shown in FIG. 11, and may control the wireless charging power toward at least one target PRU (e.g. one or more of the plurality of PRUs) in response to the received packet. Please note that, for better comprehension, the PTU may be taken as an example of the transmitter Tx. This is for illustrative purposes only, and is not meant to be a limitation of the present invention. According to some embodiments, implementation of the transmitter Tx may vary.

In Step 810, the control circuit of the PTU may check whether the predetermined header content "OVP" is received through the received packet (e.g. the so-called Receive "OVP" in FIG. 12, for brevity), or may detect whether the transmitter current Itx of transmitter pad 20 (e.g. the transmitter coil current ITX_COIL mentioned in some of the above embodiments) is toggling. When the predetermined header content "OVP" is received or the transmitter current Itx is toggling, Step 812 is entered; otherwise, Step 820 is entered.

In Step 812, the control circuit of the PTU may be in a latching fault state (which can be referred to as latching fault, for brevity), to keep reducing the wireless charging power toward the target PRU. For example, in a situation where the received packet is the first one of a series of received packets in which each received packet carries the predetermined header content "OVP", the control circuit of the PTU may start entering the latching fault state. In some examples, in a situation where the received packet is within this series of received packets and is not the first one of this series of received packets, the PTU may keep staying in the latching fault state.

Please note that, as the associated slot time (such as that for the aforementioned first packet being sent) has been controlled to be 25 ms by the target PRU, and as 25 ms is the minimum slot time among others that can be set within the working flow 700, the charging control corresponding to the first priority (e.g. Priority 1) will take effect faster than that respectively corresponding to the second priority (e.g. Priority 2), the third priority (e.g. Priority 3), and the fourth priority (e.g. Priority 4).

In Step 820, the control circuit of the PTU may check whether the predetermined header content "DN" is received through the received packet (e.g. the so-called Receive "DN" in FIG. 12, for brevity). When the predetermined header content "DN" is received, Step 822 is entered; otherwise, Step 830 is entered.

In Step 822, the control circuit of the PTU may decrease the wireless charging power toward the target PRU (e.g. the so-called power down in FIG. 12, for brevity) every 250 ms since the associated slot time (such as that for the aforementioned second packet being sent) has been controlled to be 250 ms.

In Step 830, the control circuit of the PTU may check whether the predetermined header content "UP" is received through the received packet (e.g. the so-called Receive "UP" in FIG. 12, for brevity) every 500 ms. When the predetermined header content "UP" is received every 500 ms, Step 832 is entered; otherwise, Step 840 is entered.

In Step 832, the control circuit of the PTU may check whether data collision within 500 ms occurs. When data collision within 500 ms occurs, Step 830 is re-entered; otherwise, Step 834 is entered.

In Step 834, the control circuit of the PTU may increase the wireless charging power toward the target PRU (e.g. the so-called power up in FIG. 12, for brevity) every 500 ms.

In Step 840, the control circuit of the PTU may check whether the predetermined header content "OK" is received through the received packet (e.g. the so-called Receive "OK" in FIG. 12, for brevity) every 4000 ms. When the predetermined header content "OK" is received every 4000 ms, Step 842 is entered; otherwise, Step 810 is re-entered.

In Step 842, the control circuit of the PTU may check whether data collision within 4000 ms occurs. When data collision within 4000 ms occurs, Step 840 is re-entered; otherwise, Step 844 is entered.

In Step 844, the control circuit of the PTU may increase or decrease the wireless charging power toward the target PRU (e.g. the so-called power up/down in FIG. 12, for brevity) every 4000 ms. As a result, the control circuit of the PTU may minimize the rectifier voltage error Vrect_error of the DC voltage level Vrect of the target PRU with maximum power utilization, to achieve the objective OBJ(4-1) mentioned above, and/or may optimize the total system efficiency, to achieve the objective OBJ(4-2) mentioned above.

According to some embodiments, the working flows 700 and 800 can be utilized as shown above. As a result of dynamically changing the slot time with aid of the charging control respectively corresponding to the aforementioned different degrees of priority, the average power consumption corresponding to various categories such as Category 1 (Cat1), Category 2 (Cat2), Category 3 (Cat3), and Category 4 (Cat4) can be greatly reduced, respectively. For one example, in a situation where the slot time is set as 250 ms, the ratio of the average power consumption to a specific reference for the categories Cat1, Cat2, Cat35, and Cat4 can be 0.15%, 0.30%, 0.60%, and 1.50%, respectively. When the slot time is changed to be 2000 ms, these percentages may become 0.02%, 0.04%, 0.08%, and 0.19%, respectively. For another example, in a situation where the slot time is set as 250 ms, the ratio of the average power consumption to a specific reference for the categories Cat1, Cat2, Cat35, and Cat4 can be 0.33%, 0.66%, 1.32%, and 3.30%, respectively. When the slot time is changed to be 2000 ms, these percentages may become 0.04%, 0.08%, 0.17%, and 0.41%, respectively.

Figure 13:
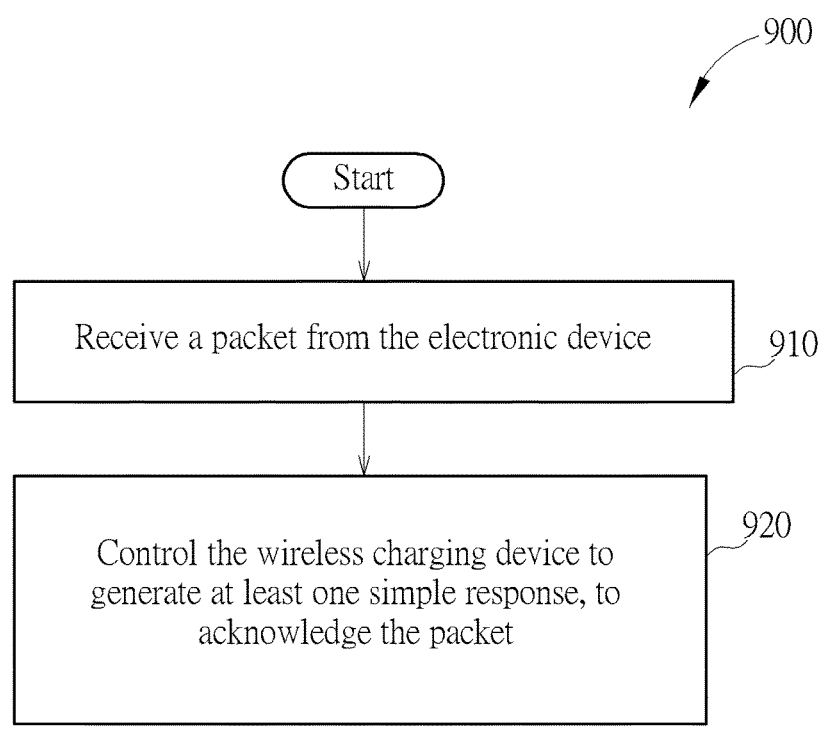
FIG. 13 illustrates a flowchart of a method for performing wireless charging control of an electronic device with aid of simple response of a wireless charging device according to another embodiment of the present invention.

FIG. 13 illustrates a flowchart of a method 900 for performing wireless charging control of an electronic device with aid of simple response of a wireless charging device according to another embodiment of the present invention. The method 900 shown in FIG. 13 can be applied to the wireless charging device such as the transmitter pad 20 (which can be taken as an example of the PTU), and more particularly, can be applied to the control circuit of the wireless charging device, and can also be applied to the wireless power transfer system 200 of the embodiment shown in FIG. 2. This is for illustrative purposes only, and is not meant to be a limitation of the present invention. According to some embodiments, the method 900 shown in FIG. 13 can be applied to the PTU mentioned in the embodiment shown in FIG. 12, and more particularly, can be applied to the control circuit of the PTU. The method can be described as follows.

In Step 910, the control circuit of the wireless charging device may receive a packet from the electronic device, where the packet may be utilized for carrying information of wireless charging reports of the electronic device, and may comprise unacknowledged header information. For example, the control circuit of the wireless charging device may receive a plurality of packets from the electronic device, and the plurality of packets may comprise the packet mentioned in Step 910, where each packet of the plurality of packets is utilized for carrying information of wireless charging reports of the electronic device, and comprises unacknowledged header information. Examples of the plurality of packets comprising the packet mentioned in Step 910 may include, but not limited to, the aforementioned at least one random phase-delay packet of Step 320, the aforementioned at least one random phase-delay packet of Step 620, the packets of Step 712, Step 722, Step 732, and Step 740 in the working flow 700 shown in FIG. 11, and the received packet mentioned in the embodiment shown in FIG. 12. Examples of the unacknowledged header information may include, but not limited to, the predetermined header content "OVP" in the packet mentioned in Step 712, the predetermined header content "DN" in the packet mentioned in Step 722, the predetermined header content "UP" in the packet mentioned in Step 732, and the predetermined header content "OK" in the packet mentioned in Step 740.

In Step 920, the control circuit of the wireless charging device may control the wireless charging device to generate at least one simple response, to acknowledge the packet. Examples of the aforementioned at least one simple response may include, but not limited to, at least one simple response corresponding to at least one packet of the plurality of packets, for acknowledging the aforementioned at least one packet of the plurality of packets. For example, the control circuit of the wireless charging device may control the wireless charging device to generate the aforementioned at least one simple response corresponding to the aforementioned at least one packet of the plurality of packets, without sending information from the wireless charging device to the electronic device through any packet, to acknowledge the aforementioned at least one packet of the plurality of packets. More particularly, the wireless charging device does not send any packet to the electronic device. This is for illustrative purposes only, and is not meant to be a limitation of the present invention. According to some embodiments, the generation of the aforementioned at least one simple response to acknowledge the packet does not have to send any packet to the electronic device. Therefore, the present invention method and the associated apparatus (e.g. the method 900 and the apparatus 100) can keep power control loops of the wireless power transfer system 200 working by a simple one way communications control scheme, free from any dual way communications regulation, where power consumption can be reduced when the wireless charging device such as the transmitter pad 20 is not transmitting any modulation signal (e.g. the wireless charging). In comparison with the related art, the present invention method and the associated apparatus can guarantee the overall performance, and the related art problems (e.g. the problem of increased costs, and the problem of insufficiency of the channels within the frequency band) can be prevented.

According to some embodiments, the aforementioned at least one packet of the plurality of packets comprising the packet mentioned in Step 910 may comprise at least one random phase-delay packet such as that mentioned in Step 320 or that mentioned in Step 620, where each random phase-delay packet of the aforementioned at least one random phase-delay packet of these embodiment has a random phase-delay with respect to a time slot, and the aforementioned at least one random phase-delay packet of these embodiment is utilized for carrying information of at least one wireless charging report of the electronic device, such as that mentioned in any of the embodiments respectively shown in FIG. 3 and FIG. 10.

According to some embodiments, the aforementioned at least one simple response may be detectable by the electronic device. For example, the electronic device may detect the aforementioned at least one simple response as acknowledgement of the packet mentioned in Step 910 (e.g. acknowledgement of the aforementioned at least one packet of the plurality of packets comprising the packet mentioned in Step 910), having no need to perform decoding on the aforementioned at least one simple response. According to some embodiments, the aforementioned at least one simple response may comprise at least one predetermined signal pulse in the time domain or in the frequency domain.

Figure 14:
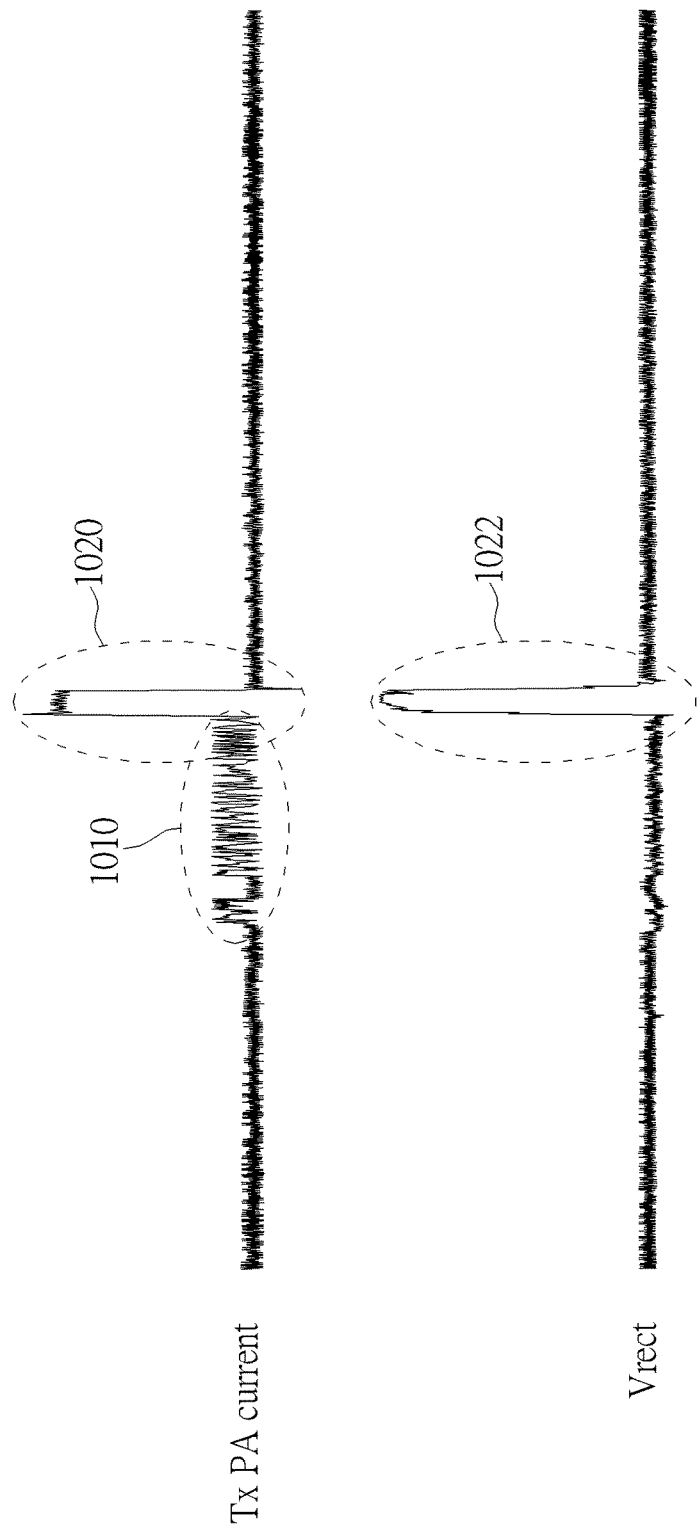
FIG. 14 illustrates a simple response control scheme involved with the method shown in FIG. 13 according to an embodiment of the present invention.

FIG. 14 illustrates a simple response control scheme involved with the method 900 shown in FIG. 13 according to an embodiment of the present invention. The curve shown in the upper half of FIG. 14 may represent the transmitter power amplifier (Tx PA) current of a Tx PA in the wireless charging device, such as the output current of the Tx PA (e.g. the transmitter coil current ITX_COIL of transmitter pad 20 may be regarded as the Tx PA current, or may be proportional to the Tx PA current), and the curve shown in the lower half of FIG. 14 may represent the DC voltage level Vrect of a specific PRU of the plurality of PRUs, such as the target PRU.

As shown in FIG. 14, there are some vibrations 1010 before the pulse 1020 in the waveforms of the Tx PA current, and these vibrations 1010 may correspond to Tx decoding (e.g. the transmitter pad 20 may decode some wireless charging reports from the specific PRU and generate these vibrations 1010 correspondingly). When the Tx decoding is completed, the control circuit of the wireless charging device may generate a single pulse such as the pulse 1020 in the waveforms of the Tx PA current, and may utilize this single pulse as the aforementioned at least one simple response of Step 920. In response to the aforementioned at least one simple response such as this single pulse (e.g. the pulse 1020), the DC voltage level Vrect of the specific PRU may vary correspondingly. As a result, there is a corresponding pulse 1022 in the waveforms of the DC voltage level Vrect of the specific PRU. Thus, the control circuit of the wireless charging device may control the wireless charging device to generate the aforementioned at least one simple response corresponding to the aforementioned at least one packet of the plurality of packets, without sending information from the wireless charging device to the electronic device through any packet, to acknowledge the aforementioned at least one packet of the plurality of packets comprising the packet mentioned in Step 910. According to this embodiment, as the electronic device (more particularly, the specific PRU) does not need to decode the aforementioned at least one simple response, the aforementioned at least one simple response is indeed simple, where the wireless charging device does not send any packet to the electronic device. For brevity, similar descriptions for this embodiment are not repeated in detail here.

Figure 15:
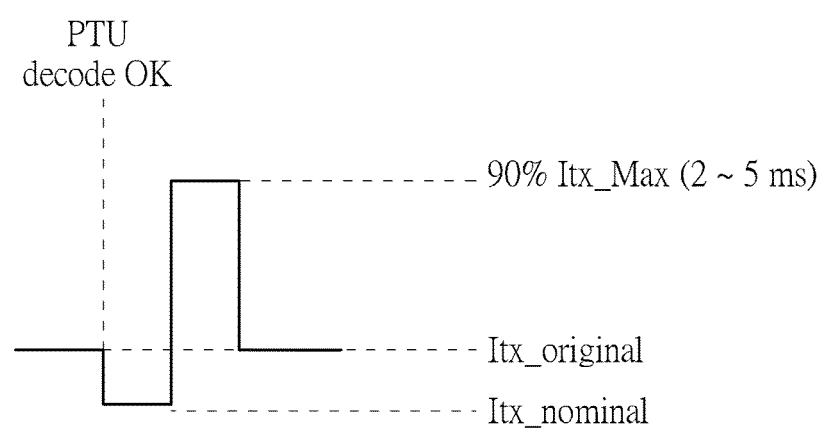
FIG. 15 illustrates a simple response involved with the method shown in FIG. 13 according to an embodiment of the present invention.

FIG. 15 illustrates a simple response (e.g. a single pulse such as that mentioned above) involved with the method 900 shown in FIG. 13 according to an embodiment of the present invention. For better comprehension, the simple response control scheme shown in FIG. 14 can still be applied to a PTU such as that mentioned in the embodiment shown in FIG. 11, and the control circuit of the wireless charging device may control the Tx PA current of the Tx PA of this PTU to generate the single pulse according to the waveforms shown in FIG. 15.

As shown in FIG. 15, the Tx PA current may be originally kept at the transmitter original current Itx_original. When the aforementioned Tx decoding is completed (e.g. the so-called PTU decode OK in FIG. 15, for better comprehension), the control circuit of the wireless charging device may control the Tx PA current to stay at the transmitter nominal current Itx_nominal for a while, and then control the Tx PA current to become 90% of the transmitter maximum current Itx_Max for a predetermined time period such as a fixed time period falling within the range starting from 2 ms through to 5 ms, to form the rising edge of the single pulse. Afterward, the control circuit of the wireless charging device may control the Tx PA current to be at the transmitter original current Itx_original again, to form the falling edge of the single pulse. As a result, the single pulse can be easily and correctly detected by the electronic device (more particularly, by the PRU). For brevity, similar descriptions for this embodiment are not repeated in detail here.

Figure 16:
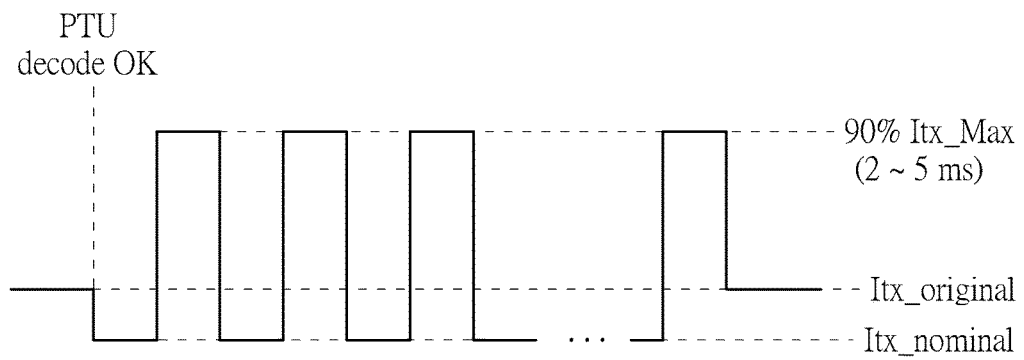
FIG. 16 illustrates a simple response involved with the method shown in FIG. 13 according to another embodiment of the present invention.

FIG. 16 illustrates a simple response (e.g. a pulse chain such as a series of pulses) involved with the method 900 shown in FIG. 13 according to another embodiment of the present invention. For better comprehension, the simple response control scheme shown in FIG. 14 can still be applied to a PTU such as that mentioned in the embodiment shown in FIG. 11, except that the single pulse is replaced by the series of pulses, where the control circuit of the wireless charging device may control the Tx PA current of the Tx PA of this PTU to generate the series of pulses according to the waveforms shown in FIG. 16.

As shown in FIG. 16, the Tx PA current may be originally kept at the transmitter original current Itx_original. When the aforementioned Tx decoding is completed (e.g. the so-called PTU decode OK in FIG. 16, for better comprehension), the control circuit of the wireless charging device may control the Tx PA current to stay at the transmitter nominal current Itx_nominal for a while, and then control the Tx PA current to become 90% of the transmitter maximum current Itx_Max for a predetermined time period such as a fixed time period falling within the range starting from 2 ms through to 5 ms, to form the rising edge of the first pulse of the series of pulses. Afterward, the control circuit of the wireless charging device may control the Tx PA current to be at the transmitter nominal current Itx_nominal again, to form the falling edge of the first pulse of the series of pulses. The remaining pulse of the series of pulses may be generated in a similar manner, except that the control circuit of the wireless charging device may control the Tx PA current to be at the transmitter original current Itx_original to form the falling edge of the last pulse of the series of pulses. As a result, the series of pulses can be easily and correctly detected by the electronic device (more particularly, by the PRU). For brevity, similar descriptions for this embodiment are not repeated in detail here.

Figure 17:
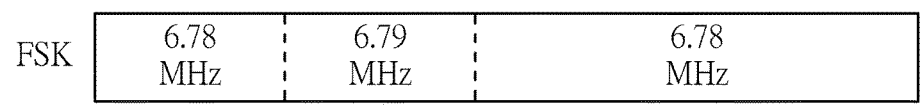
FIG. 17 illustrates a simple response involved with the method shown in FIG. 13 according to another embodiment of the present invention.

FIG. 17 illustrates a simple response (e.g. a single pulse in a frequency domain) involved with the method 900 shown in FIG. 13 according to another embodiment of the present invention. For example, the control circuit of the wireless charging device may utilize a frequency shift keying (FSK) simple response method (labeled "FSK" in FIG. 17, for brevity) for controlling the single pulse in the frequency domain. This is for illustrative purposes only, and is not meant to be a limitation of the present invention. According to some embodiments, the control circuit of the wireless charging device may utilize another method for controlling the single pulse in the frequency domain.

According to this embodiment, the control circuit of the wireless charging device may control the Tx PA current to originally carry a predetermined frequency 6.78 megahertz (MHz), and then change in the frequency domain to become another predetermined frequency 6.79 MHz, to form the rising edge of the single pulse in the frequency domain. Afterward, the control circuit of the wireless charging device may control the Tx PA current to change in the frequency domain to become the predetermined frequency 6.78 MHz again, to form the falling edge of the single pulse in the frequency domain. As a result, the single pulse in the frequency domain can be easily and correctly detected by the electronic device (more particularly, by the PRU). For brevity, similar descriptions for this embodiment are not repeated in detail here.

According to some embodiments, the pulse in the frequency domain may be replaced by a series of pulses in the frequency domain. For example, the control circuit of the wireless charging device may control the Tx PA current to originally carry a predetermined frequency 6.78 MHz, and then change in the frequency domain to become another predetermined frequency 6.79 MHz, to form the rising edge of the first pulse of the series of pulses in the frequency domain. Afterward, the control circuit of the wireless charging device may control the Tx PA current to change in the frequency domain to become the predetermined frequency 6.78 MHz again, to form the falling edge of the first pulse of the series of pulses in the frequency domain. The remaining pulse of the series of pulses in the frequency domain may be generated in a similar manner. As a result, the series of pulses in the frequency domain can be easily and correctly detected by the electronic device (more particularly, by the PRU). For brevity, similar descriptions for these embodiments are not repeated in detail here.

According to some embodiments, a PRU of the plurality of PRUs, such as the target PRU, may send a random delay packet containing unacknowledged header information. The PTU mentioned in the embodiment shown in FIG. 15 may response with the transmitter nominal current Itx_nominal for 2 ms and a rising pulse having a specific pulse height of a known percentage (e.g. 90%) of the transmitter maximum current Itx_Max and having a specific pulse width (e.g. from 2 ms to 5 ms) when decoding OK. In addition, the PRU may detect the rising or falling behaviors of the DC voltage level Vrect and the associated timing to determine whether the unacknowledged header information (e.g. the predetermined header content "OVP" in the packet mentioned in Step 712, the predetermined header content "DN" in the packet mentioned in Step 722, the predetermined header content "UP" in the packet mentioned in Step 732, or the predetermined header content "OK" in the packet mentioned in Step 740) is granted by the PTU. If the PRU cannot detect an abrupt change of the DC voltage level Vrect (e.g. the so-called Vrect jump), then the PRU may keep sending random delay packets having the same content of the unacknowledged header information again and again, to make sure that the PTU can decode this message (more particularly, can be notified of the unacknowledged header information). This is for illustrative purposes only, and is not meant to be a limitation of the present invention. According to some embodiments, some other simple response method without complicated encode/decode request to prevent from false detection may be applied. For example, a pulse chain such as that mentioned above, rather than a single pulse, may be utilized as the aforementioned at least one simple response of Step 920. In some examples, the control circuit of the PTU may utilize the FSK simple response method mentioned in the embodiment shown in FIG. 7, to perform frequency modulation of changing from or to the original frequency 6.78 MHz. In addition, the associated modulation result of the frequency may fall within a predetermined frequency range, where the predetermined frequency range may be greater than or equal to a lower limit frequency of (6.78 MHz−10 kHz), and may be less than or equal to an upper limit frequency of (6.78 MHz+10 kHz).

According to some embodiments, the PRU may further fix the packet delay time and send the subsequent packets with acknowledged header information once it is acknowledged by the PTU. In addition, the PTU may reduce the size of the detection window to be equal to the slot time of the PRU when all packets are decoded OK with acknowledged header information. Additionally, the PRU may synchronize the packet delay time with the resonant frequency of the PTU to diminish the timing drift between the PTU and the PRU. Further, the PRU may issue (or send) an unacknowledged packet after a long time (e.g. a time period from one minute to ten minutes, or another length of time) to prevent possible false detection or timing drift if timing synchronization is supported. For brevity, similar descriptions for these embodiments are not repeated in detail here.

According to some embodiments, a method for performing wireless charging control of the electronic device with aid of variant slot timing is further provided, where the method may comprise: performing uni-directional packet transmission between the electronic device and the wireless charging device, where the wireless charging device is arranged to wirelessly charge the electronic device, and at least one packet of the uni-directional packet transmission (e.g. the aforementioned at least one packet in the embodiment shown in FIG. 10 or another embodiment within the above embodiments) is utilized for carrying information of at least one wireless charging report of the electronic device; and controlling a time slot of the uni-directional packet transmission to be variant. For example, controlling the time slot of the uni-directional packet transmission to be variant may comprise changing a length of the time slot of the uni-directional packet transmission in response to a plurality of predetermined condition such as the predetermined condition respectively corresponding to the first priority (e.g. Priority 1), the second priority (e.g. Priority 2), the third priority (e.g. Priority 3), and the fourth priority (e.g. Priority 4) mentioned above. For brevity, similar descriptions for these embodiments are not repeated in detail here.

According to some embodiments, the method may further comprise: when a first predetermined condition of the plurality of predetermined condition is detected, changing a length of the time slot of the uni-directional packet transmission to be a first predetermined length. For example, the first predetermined condition is more emergent than a second predetermined condition of the plurality of predetermined condition, and the method may further comprise: when the second predetermined condition is detected, changing the length of the time slot of the uni-directional packet transmission to be a second predetermined length, where the first predetermined length is shorter than the second predetermined length. For example, the predetermined length of 25 ms in Step 712 is shorter than each of the predetermined length of 250 ms in Step 722 and the predetermined length of 250 ms in Step 732, while the predetermined condition corresponding to the first priority (e.g. Priority 1) is more emergent than each of the predetermined condition corresponding to the second priority (e.g. Priority 2) and the predetermined condition corresponding to the third priority (e.g. Priority 3). In another example, each of the predetermined length of 250 ms in Step 722 and the predetermined length of 250 ms in Step 732 is shorter than the predetermined length of 2000 ms in Step 740, while each of the predetermined condition corresponding to the second priority (e.g. Priority 2) and the predetermined condition corresponding to the third priority (e.g. Priority 3) is more emergent than the predetermined condition corresponding to the fourth priority (e.g. Priority 4). For brevity, similar descriptions for these embodiments are not repeated in detail here.

According to some embodiments, the method may further comprise: determining the voltage level of the DC output at the DC output terminal T21 of the rectifier 50 in the electronic device, such as the DC voltage level Vrect; and according to the voltage level of the DC output, changing the length of the time slot of the uni-directional packet transmission. For example, changing the length of the time slot of the uni-directional packet transmission further comprises: when the voltage level of the DC output (e.g. the DC voltage level Vrect) reaches a predetermined voltage level such as Vrect_max, decreasing the length of the time slot (e.g. decreasing the length of the time slot to be 25 ms, as shown in FIG. 11); and when the voltage level of the DC output (e.g. the DC voltage level Vrect) falls within a predetermined voltage range such as the range of the interval [Vrect_low, Vrect_high], increasing the length of the time slot (e.g. increasing the length of the time slot to be 2000 ms, as shown in FIG. 11). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wireless charging control of an electronic device, the method comprising the steps of:
    detecting, by a controller of the electronic device, a voltage level of a direct current (DC) output at a DC output terminal of a rectifier in the electronic device;
    determining, by the controller, whether the voltage level of the direct current output at the DC output terminal of the rectifier falls within a first voltage range;
    generating, by the controller, a first detection result indicating whether the voltage level of the DC output at the DC output terminal of the rectifier falls within the first voltage range; and
    by a communications module of the electronic device, selectively sending at least one packet to a wireless charging device, wherein the at least one packet is sent with a timing that is based on the first detection result, and wherein the at least one packet is utilized for carrying wireless charging information of the electronic device.

2. The method of claim 1, wherein the wireless charging device is arranged to wirelessly charge the electronic device; and the step of selectively sending the at least one packet further comprises: according to the first detection result, selectively sending the at least one packet to the wireless charging device, without receiving a packet from the wireless charging device to acknowledge the at least one packet.

3. The method of claim 1, wherein the first detection result indicates that the voltage level of the DC output does not fall within the first voltage range, and the wireless charging device is arranged to wirelessly charge the electronic device; and the method further comprises:
    determining at least one random value for controlling a timing of packet transmission with the wireless charging information;
    wherein the step of selectively sending the at least one packet further comprises:
    based on the at least one random value, sending the at least one packet with a random phase delay with respect to a time slot to the wireless charging device, to trigger an associated wireless charging control operation of the wireless charging device.

4. The method of claim 1, further comprising determining whether the voltage level of the DC output falls within a second voltage range, wherein determining whether the voltage level of the DC output falls within the first voltage range has higher priority than determining whether the voltage level of the DC output falls within the second voltage range.

5. The method of claim 1, further comprising:
    determining whether the voltage level of the DC output falls within a second voltage range to generate a second detection result; and
    according to the first and the second detection results, controlling a slot time for a packet being sent as a first predetermined slot time corresponding to the first voltage range or a second predetermined slot time corresponding to the second voltage range.

6. The method of claim 5, wherein the second predetermined slot time is greater than or equal to the first predetermined slot time.

7. An apparatus for performing wireless charging control of an electronic device, the apparatus comprising at least one portion of the electronic device, the apparatus comprising:
    a controller arranged for determining whether a voltage level of a direct current (DC) output at a DC output terminal of a rectifier in the electronic device falls within a first voltage range, and arranged for generating a first detection result indicating whether the voltage level falls within the first voltage range; and
    a communications module, coupled to the controller and a coil of the electronic device, arranged for, according to the first detection result, selectively sending at least one packet to a wireless charging device, wherein the at least one packet is utilized for carrying wireless charging information of the electronic device, wherein a timing at which the at least one packet is sent is based on the first detection result.

8. A method for performing wireless charging control of an electronic device with aid of a response of a wireless charging device, which is arranged to wirelessly charge the electronic device, the method comprising the steps of:
    receiving, by the wireless charging device, a packet from the electronic device, wherein the packet is utilized for carrying wireless charging information of the electronic device, and the packet comprises header information; and controlling, by a controller, the wireless charging device to generate the response, to acknowledge the packet, wherein the response does not include a packet.

9. The method of claim 8, wherein the electronic device detects the response as acknowledgement of the packet, having no need to perform decoding on the response.

10. The method of claim 8, wherein the response comprises at least one predetermined signal pulse in a time domain or in a frequency domain.

11. An apparatus for performing wireless charging control according to the method of claim 8, wherein the apparatus comprises at least one portion of the electronic device.

12. A method for performing wireless charging control of an electronic device with aid of variant slot timing, the method comprising:

detecting, by a controller of the electronic device, a voltage level of a direct current (DC) output at a DC output terminal of a rectifier in the electronic device;

by a communication module, performing packet transmission between the electronic device and a wireless charging device, wherein the wireless charging device is arranged to wirelessly charge the electronic device, and at least one packet of the packet transmission is utilized for carrying wireless charging information of the electronic device; and varying, by the controller, a length of a time slot of the packet transmission based on the voltage level of the DC output.

13. The method of claim 12, wherein varying the length of the time slot of the packet transmission further comprises:

when the voltage level of the DC output reaches a predetermined voltage level, decreasing the length of the time slot; or when the voltage level of the DC output falls within a predetermined voltage range, increasing the length of the time slot.

* * * * *